United States Patent [19]

Gfeller

[11] Patent Number: 5,218,584
[45] Date of Patent: Jun. 8, 1993

[54] INTEGRATED OPTICAL HEAD STRUCTURE

[75] Inventor: Fritz Gfeller, Rüschlikon, Switzerland

[73] Assignee: International Business Machines Corporation, Armonk, N.Y.

[21] Appl. No.: 783,479

[22] Filed: Oct. 28, 1991

[30] Foreign Application Priority Data

Oct. 30, 1990 [CH] Switzerland ............ 90810827

[51] Int. Cl.⁵ .................................... G11B 7/00
[52] U.S. Cl. ........................ 369/44.12; 369/44.23; 369/112
[58] Field of Search ............. 369/44.12, 44.11, 112, 369/122, 44.23, 110, 44.24; 359/34, 127, 131; 250/201.5, 227.11

[56] References Cited

FOREIGN PATENT DOCUMENTS

| | | | |
|---|---|---|---|
| 0412638 | 2/1991 | European Pat. Off. ............ | 369/112 |
| 61-236037 | 10/1986 | Japan ............................... | 369/44.12 |
| 61-269236 | 11/1986 | Japan ............................... | 369/44.12 |

Primary Examiner—Andrew L. Sniezek
Assistant Examiner—Nabil Hindi
Attorney, Agent, or Firm—Donald M. Boles; Eric W. Petraske

[57] ABSTRACT

A semiconductor optical head structure for accessing storage locations on an optical storage medium, such as an optical disk, for writing, erasing, and reading of information, including tracking-error detection and focusing-error detection systems is taught. Both error detection systems are optically and electrically separated to avoid any mutual inter-ference of the error signals, and all optical elements of the optical head are integrated on one chip. The focusing-error signal is generated by deflecting a separate beam (20A) out of an optical head and focusing it onto the surface of an optical disk and detecting the reflected portion thereof. The separate readout and tracking-error signal is generated by employing a light beam which is focused on the center of the pits of a track and detecting the diffracted portion thereof. Focusing-errors can be reduced by actuating the head perpendicular to the disk using a coil. If a tracking-error is measured, the head can be moved using an actuator, until the error is minimized. The required optical head can be grown on a compound semiconductor material, such as GaAs, using planar fabrication technology.

36 Claims, 17 Drawing Sheets

INTEGRATED OPTICAL HEAD STRUCTURE

TECHNICAL FIELD

The invention relates to a semiconductor optical head for accessing storage locations and including tracking-error and focusing-error detection systems implemented on the same chip. Both error detection systems are decoupled in order to avoid any mutual interference.

BACKGROUND OF THE INVENTION

Initialized by the vast increase in information that needs to be processed, optical storage systems have become more and more important particularly because of their high storage density per area which can be more than 10 times as high as that of systems utilizing a magnetic medium. Video disk, digital audio disk, digital information storage disk, etc. are some examples of memory systems employing optical storage media.

In most optical storage systems rotating optical disks are used on which the information is digitally stored in concentric circular tracks in an ordered, predefined manner to allow chronological fast reading and fast random access to desired blocks of data.

For reading, normally an optical head is used to scan the disk, moving disk and head relative to each other. The head focuses a light beam onto the storage surface and detects the reflected portion thereof. The reflected beam is then transformed into an electric output signal.

To reduce reading errors, to improve the signal to noise ratio (S/N ratio), and to avoid optical head damage it is necessary to control the distance and inclination between the head and the optical-storage medium. For this purpose focusing-error and tracking-error detection is required.

For writing, normally the same optical head can be used to emit short pulses of high laser power heating the optical storage medium, e.g. an optical phase change medium to above the melting point, thus leaving marks of different reflectifity.

Two of the main requirements of optical heads, also known as pickup devices, are compact size to allow high speed access, and accurate tracking and focusing to allow high density data storage.

Starting from the earlier systems that employ external light sources, single optical lenses and photodetectors, which are bulky and massive, the trend is towards semiconductor optical heads constructed with integrated optics using waveguides, light- sensitive elements, grating couplers and lasers, thus allowing a reduction of size and weight.

One important step in order to reduce size was the employment of grating couplers. Because they are not as well known as other elements which have been described in numerous articles and books, we have listed references relating to grating couplers and their applications that are representative of the state of the art and which include:

Article "Grating coupler for efficient exitation of optical guided waves in thin films," published in Appl. Phys. Lett., Vol. 16, June 1970, pp. 523-525, gives a funda- mental description of the grating coupler principle.

Article "Waveguide grating lenses for optical couplers," published in Applied Optics, Vol. 23, No. 11, June 1984, pp. 1749-1753 discloses a method of constructing chirped grating couplers using a computer and an electronic beam exposure system.

Article "Aberration characterizations of a focusing grating coupler in an integrated- optic disk pickup device," published in Applied Optics, Vol. 26, No. 22, November 1987, pp. 4777-4782 reports on theoretical calculations of ray and wave aberrations of a focusing grating coupler (FGC).

With respect to tracking and focusing, the following references are the closest prior art known to the applicant:

"An integrated-optic disk pickup device," published in IEEE Journal of Lightwave Technology, Vol. LT-4, No. 7, July 1986, pp. 913-917, is an article where a monolithic- integrated optical-disk pickup device is proposed. This pickup device is constructed with integrated optics and has been realized on a silicon substrate. The pickup device comprises a twin grating focusing beam splitter (TGFBS), a focusing grating coupler (FGC), a wave guide, and several photodiodes (PD) in a film waveguide layer. A laser beam diverging from a butt-coupled external laser diode is focused by the FGC into one point on an optical disk. The reflected wave is collected and split by the TGFBS. Four PD's receive the back-coupled wave, and external electronic devices have to be employed to separate readout, focusing- error, and tracking-error signals.

U.S. patent U.S. Pat. No. 4 760 568, "Optical information processing device," discloses an optical head device similar to the device described in the above cited reference. The inventor has placed the laser into a hollow to reduce stray beams emitted from the laser, which are injected into the photodetectors placed next to the laser.

These known systems are based on silicon-technology which does not allow the integration of a laser. The employment of other semiconductor materials, such as Gallium arsenide (GaAs), allowing the fabrication of optical pickup devices with integrated laser-structures, has not been suggested in the art. Hitherto an external laser had to be fixed to the device.

Some of the problems, caused by the employment of a separate laser are energy loss of the laser beam which has to pass through the interface between laser and device, and stray beams caused by inhomogeneities. In addition, it is necessary to adjust the position of the external laser with high accuracy during pack- aging.

In order to provide high density there is a demand for accurate tracking and focusing, based on tracking-error and focusing-error detection systems. The tracking- and focusing-error detection system of the devices described in the references consists of a focusing grating coupler deflecting the beam emitted from an external laser, out from the device and focusing it to form a single spot used to obtain the readout, tracking-error, and focusing-error signals. The three signals are dependent on each other and a final separation of the signals requires complicated and complex analyser circuitry. In addition to the required complexity, there is the problem that complete decoupling of the signals is not possible without interference. The accuracy of these error detection systems is limited by these interferences.

Despite the fact that the devices known to the applicant still suffer from a number of deficiencies, no suggestion has yet been made to make use of compound semiconductor materials, as GaAs for example, allowing the integration of all optical elements. Furthermore the employment of waveguide networks and optical and electrical separation of the error detection systems has not been shown before.

SUMMARY OF THE INVENTION

It is an object of the present invention to provide a semiconductor optical head structure capable of performing the functions of accessing storage locations and generating decoupled tracking-error and focusing-error signals.

Another object is to provide a semiconductor optical head structure in which all optical elements such as lasers, light-sensitive elements, grating couplers, and waveguides are integrated.

A further object is to provide a semiconductor optical head structure with an integrated interfero- metric focusing-error detection system, which is capable of producing periodic interference fringes corresponding to vertical disk movements of a quarter wavelength.

The invention as claimed is intended to meet these objectives and to remedy the remaining problems of known optical heads. In the present inventive semiconductor structure this is accomplished in that the tracking-error detection system and the focusing- error detection system are optically and electrically separated. The lightwave emitted from a laser which may be integrated, is fed into a waveguide network which splits the lightwave into at least two portions and guides them to the different independent error detection systems. The optical separation of the error detection systems allows the integration of a highly accurate interferometric focusing-error detection system.

This inventive semiconductor optical head structure can be fabricated by planar fabrication technology using compound semiconductor materials such as GaAs.

A distinct advantage of the present invention is that due to the optical and electrical separation of the error detection systems, the error signals are decoupled whereby any mutual interferences are avoided which thus improves error detection accuracy. Furthermore, the employment of a wave guide network offers the possibility to integrate different types of independent error detection systems, e.g., an inter- ferometric focusing-error detection system which provides for improved focusing accuracy. The employment of compound semiconductor materials allows full integration of all optical elements, including the laser, whereby size, weight, energy losses, and packaging problems are reduced, and the need for adjusting the posistions of the light emitting and light receiving elements is eliminated.

DESCRIPTION OF THE DRAWINGS

Different ways of implementing the invention are described in detail below with reference to drawings which illustrate specific embodiments and in which.

DETAILED DESCRIPTION

Figure 1:
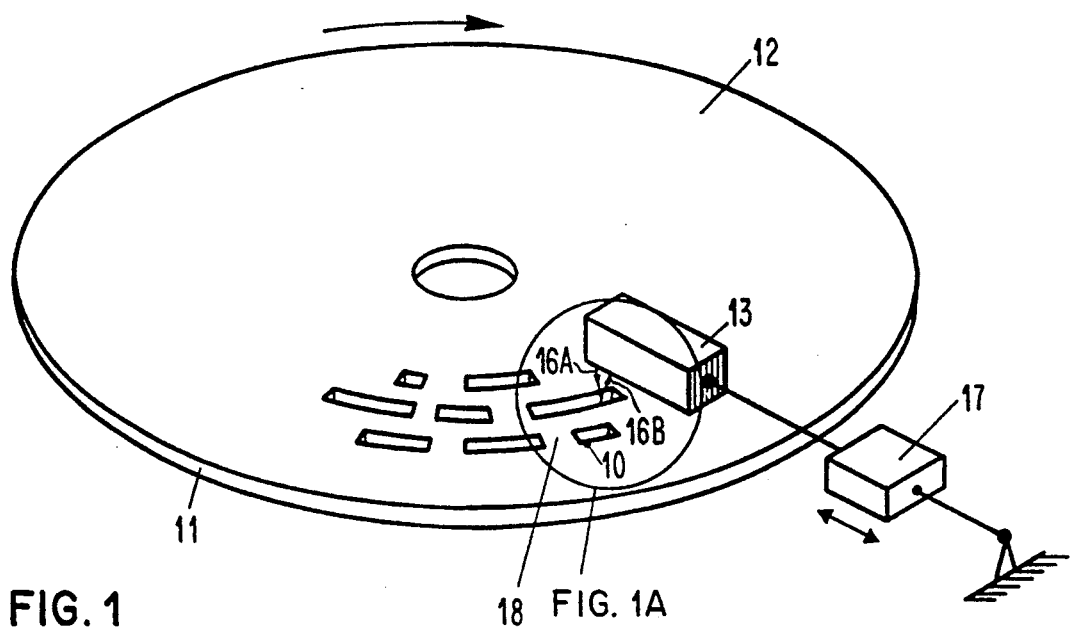
FIG. 1 is a schematic view of an optical head system and a rotating optical disk.

Before describing embodiments of the present invention in greater detail, a brief introduction to optical-storage systems is given with the aid of FIGS. 1 and 2. The description relates mainly to read-only systems.

Conventionally used are read-only optical storage-media such as CD-ROMs. The information is stored in the form of bit sequences in concentric, circular tracks on a Compact-Disk-Read-only-memory (CD-ROM). Most commonly used are disks where the bits have the form of pits stamped or burned into the surface of these disks, such that a track consists of pits representing e.g. "1" bits, separated by walls representing e.g. "0" bits. The pits, and the walls inbetween them, can be of different length. The diffraction pattern of the pits and the walls differ such that different amounts of scanning light are reflected. A sequence of bits, i.e. a string of "0's" and "1's" can therefore be stored represented as a chain of pits and walls.

Figure 1A:
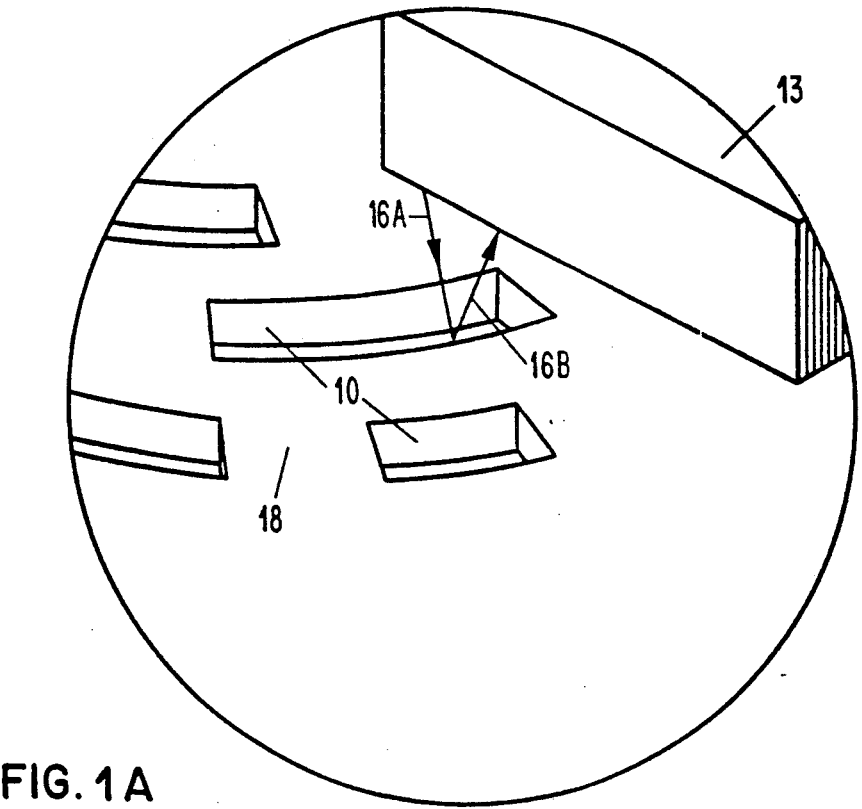
FIG. 1A is a magnified detail of FIG. 1.

FIG. 1 shows a schematic view of an optical disk 11 with pits 10, stamped into the information record- ing surface 12, and separated by walls 18, and a largely simplified optical head 13 with an actuator 17. The relief structure consisting of pits 10 and walls 18, causes the diffraction to change along the track according to the pits and walls representing the stored information. A readout signal can be generated by scanning the information recording surface 12 with beam 16A and detecting the diffracted portion 16B thereof. FIG. 1A illustrates a magnified detailed sketch of FIG. 1.

FIG. 2A–2E show the different steps of an idealized and simplified readout signal generation, under the condition that focusing and tracking-errors are minimized and the readout is free of losses. Furthermore, all pits have to have the same orientat- ion and cross-section with respect to the scanning beam 16A.

Figure 2A:
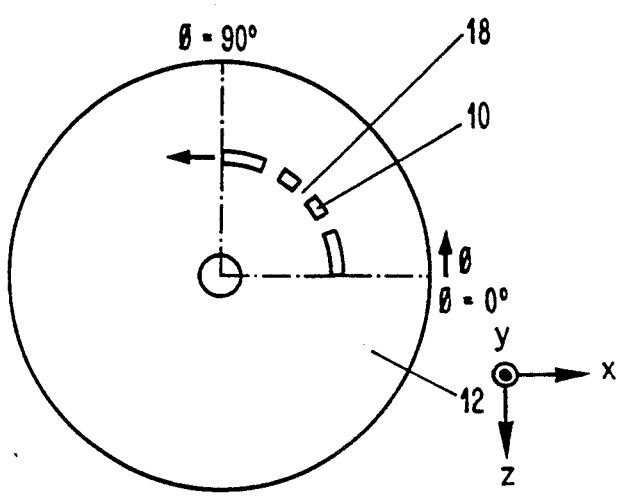
FIG. 2A is a schematic top view of an optical disk with a sequence of pits stamped into the surface of the disk.
Figure 2B:
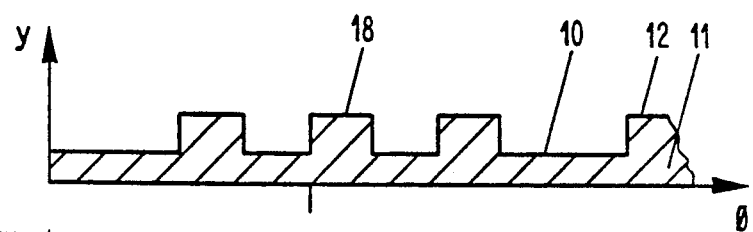
FIG. 2B is a schematic cross-sectional cut through the track of the disk which is illustrated in FIG. 2A, as a function of the angle $\phi$.

FIG. 2A illustrates a pit sequence of a track between angle $\phi = 0°$ and $\phi = 90°$. This pit sequence, as a function of the angle $\phi$, is illustrated in FIG. 2B.

Figure 2C:
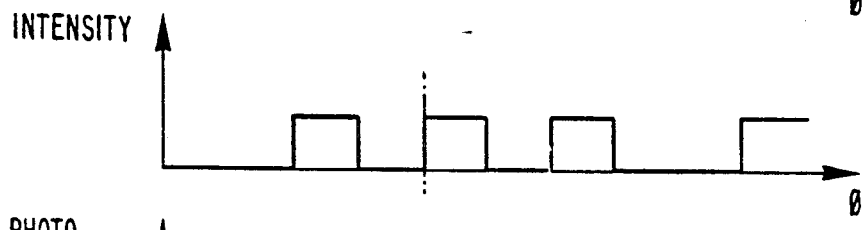
FIG. 2C shows the intensity of a light beam after being reflected at the pits, provided the incident beam is absorbed at the bottoms of the pits whereas it is reflected from the walls between the pits.
Figure 2D:
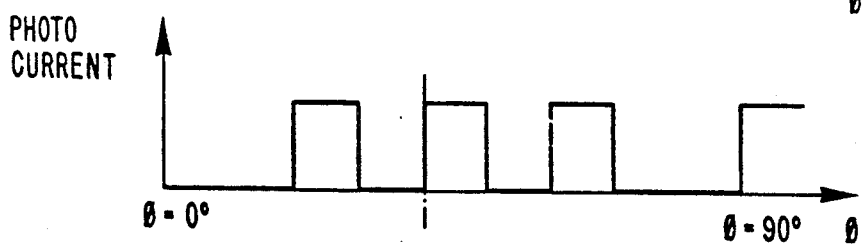
FIG. 2D shows the idealized photocurrent generated by a light-sensitive element when receiving the light beam illustrated in FIG. 2C.
Figure 2E:
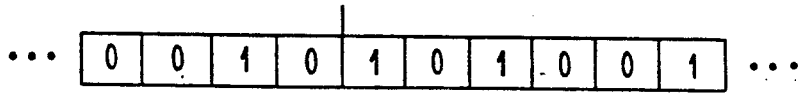
FIG. 2E shows a bit-sequence according to the photocurrent, FIG. 2D.

The idealized intensity variation of the diffracted beam 16B is shown in FIG. 2C, whereas the diagram of FIG. 2D reflects the photocurrent of an ideal photo detector, which is detecting the diffracted beams 16B. The photocurrent represents the readout signal of the optical head. The bit-sequence shown in FIG. 2E can be assigned to this photocurrent.

The present invention relates to a semiconductor optical head structure for scanning an information recording surface with focused laser beams and for detecting the reflected portions thereof. The expression reflection is used as generic term for reflection and diffraction. A schematic presentation of a system comprising a storage disk and an optical head designed in accordance with the concept of the present invention is illustrated in FIG. 3.

Figure 3:
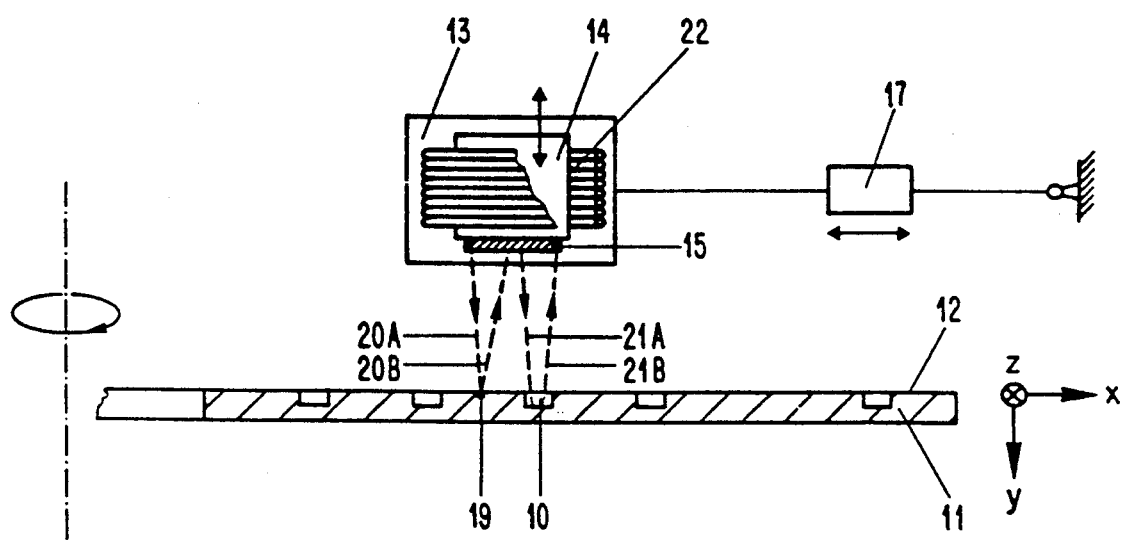
FIG. 3 is a schematic cross-sectional cut of an optical storage system comprising a semiconductor optical head device.

FIG. 3 shows a sectional view of an optical disk 11, rotating in the x-z plane, and a random access mechanism which performs the function of optimizing the position of the semiconductor optical head structure 15 with respect to the information recording surface 12 and the pits 10 of a track. As illustrated in FIG. 3, the optical head 15 is emitting two separate beams, of which only principle rays 20A and 21A are shown. This is in contrast to the optical pickup systems known in the art, using only a single beam. The optical head 15 is affixed at a moving mount 14 and located in a housing 13. The moving mount can be actuated to move parallel to the y-axis, by a magnetic coil 22. In FIG. 3, beams 21A and 21B are used to illustrate the combined readout and tracking-error detection system, whereas beams 20A and 20B illustrate the simultaneously operating focusing- error detection system. One important objective of the present invention is the optical separation of the combined readout and tracking-error detection system, and the focusing-error detection system.

The random access mechanism, mainly consisting of actuator 17 and coil 22 and housing 13, schematically illustrated in FIG. 1 and FIG. 3, can be designed as described in "Principles of Optical Disc Systems," G. Bouwhuis et al., Adam Hilgers Ltd. 1985, Bristol and Boston.

For maximum information storage density it is necessary to minimize the diameter of the scanning spot, i.e. the scanning beam has to be focused at the information recording surface. The optical head 15 has a fixed focus point 19. To bring the recording surface 12 into focus, the head can be actuated to move parallel to the y-axis, using coil 22. The focusing-error detection system determines the focusing-error and a regulating circuit is employed, in combination with an electro-magnetic mechanism, to reduce the focusing-error by moving the optical head parallel to the y-axis.

The combined readout and tracking-error detection system operates simultaneously with the described focusing-error detection system. It generates a tracking-error signal, required to keep the focused spot centered radially on the track. If a tracking- error is detected, the whole optical head can be moved parallel to the rotating disk surface 12 and perpen- dicular to the tracks and pits, using the actuator 17, to reduce the tracking-error. To optimize the head position, minimizing of the focusing-error and tracking-error signals is necessary.

Figure 4:
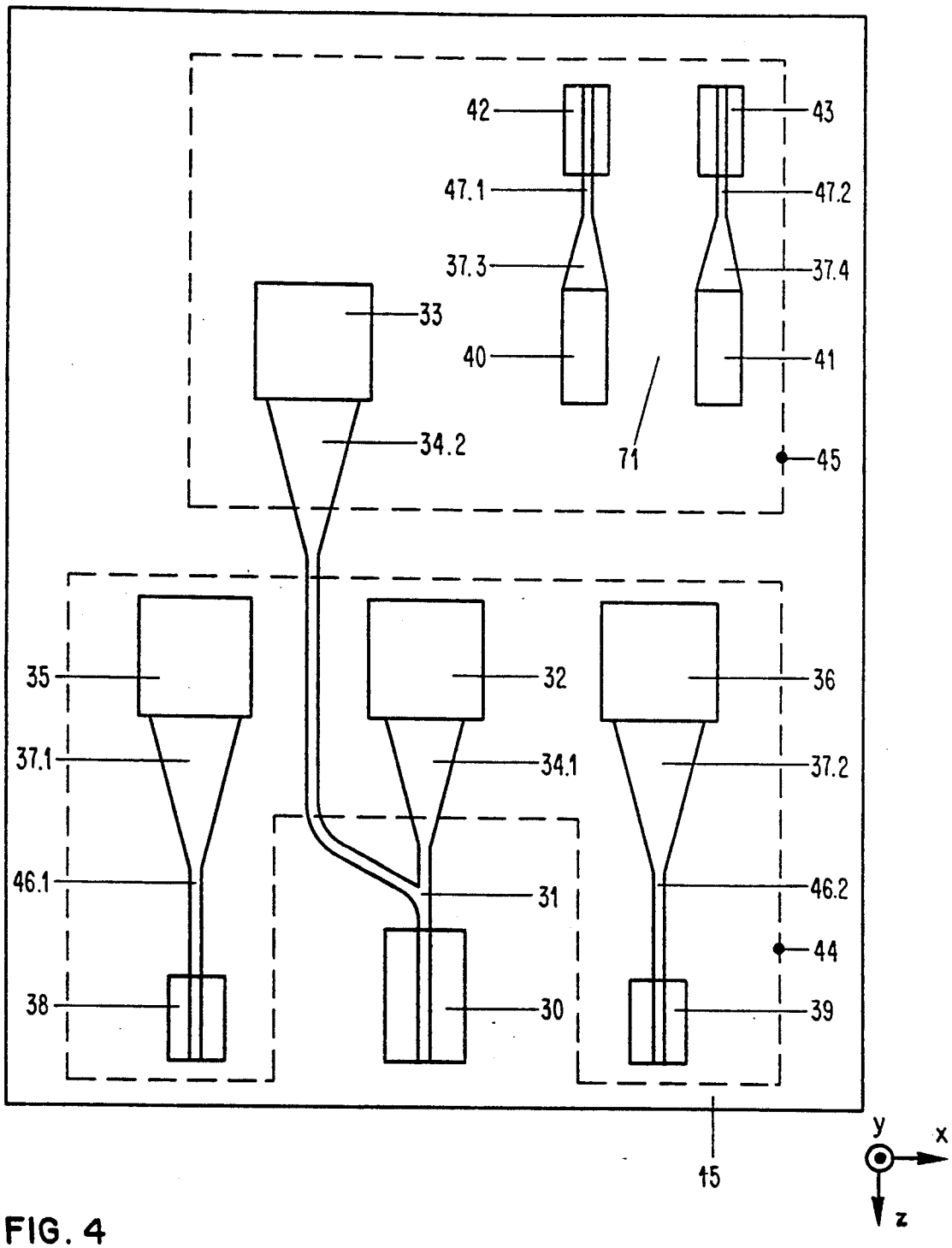
FIG. 4 is a schematic view of a first embodiment of the semiconductor optical head structure.

A first embodiment of the present invention is illustrated in greater detail in FIG. 4, where a semiconductor optical head structure 15 is shown. A laser 30 feeds a lightwave into a waveguide 31 having two branches guiding the lightwave to focusing grating couplers 32 and 33. Focusing grating coupler 32 is part of the combined readout and tracking-error detection system 44, whereas focusing grating coupler 33 is part of the focusing-error detection system 45. They are employed to deflect the light out from the waveguide 31, essentially perpendicular to the x-z plane. Waveguide horn feeds 34.1 and 34.2 with small diverging angles are used for lateral expansion of the beams.

Beam 21A of the combined readout and tracking-error detection system 44 is deflected via focusing grating coupler 32, and focused onto the recording surface 12 (FIG. 3) of, e.g., an optical disk. Here it is diffracted and via grating couplers 35 and 36 coupled back into the device. Both grating couplers 35 and 36 are connected via horn feeds 37.1, 37.2, and waveguides 46.1 and 46.2 to photo detectors 38 and 39. These horn feeds are employed for lateral compression of the beams.

The focusing-error detection system 45 consists of focusing grating coupler 33 which deflects the lightwave out of the waveguide 31, and grating couplers 40 and 41 for the detection of this lightwave after it has been reflected at the optical disk. Couplers 40 and 41 feed the detected lightwave into photo detectors 42 and 43 via hornfeeds 37.3, 37.4, and waveguides 47.1 and 47.2, as shown in FIG. 4.

To explain the operation of the device, it is helpful to divide the complete device 15 into two units fulfilling different functions, each of them demarcated by a dotted line. The first unit 44 contains the combined readout and tracking-error detection system and the second unit 45 contains the focusing-error detection system.

TRACKING-ERROR DETECTION SYSTEM 44

Light emitted from laser 30 is fed to focusing grating coupler 32. Different laser structures, known in the art, can be employed as light emitting sources. A focusing grating coupler is a kind of waveguide hologram which has a chirped and curved grating pattern to couple an input wave to a spherical wave, focusing in free space.

Gratings may be formed by etching an E-beam-generated pattern into waveguides. Further information about grating couplers is given in the articles "Aberration characterization of a focus- ing grating coupler in an integrated-optic disk pickup device," by Shogo Ura et al, published in Applied Optics, Vol. 26, No. 22, November 1987, pp. 4777–4782, and "Calculation and experimental verification of two-dimensional focusing grating couplers," by D. Heitmann et al., published in IEEE J. Quantum Electronics, Vol. QE-17, No. 7, pp. 1257–1263, July 1981, for example. The grating pattern of focusing grating coupler 32, for example, can be calculated from the phase difference between the input wave and the output wave coupled by the grating. The input wave is the light wave which is fed to the focusing grating coupler, via waveguide 31. The waveguides can be ridge waveguides for example.

Figure 5A:
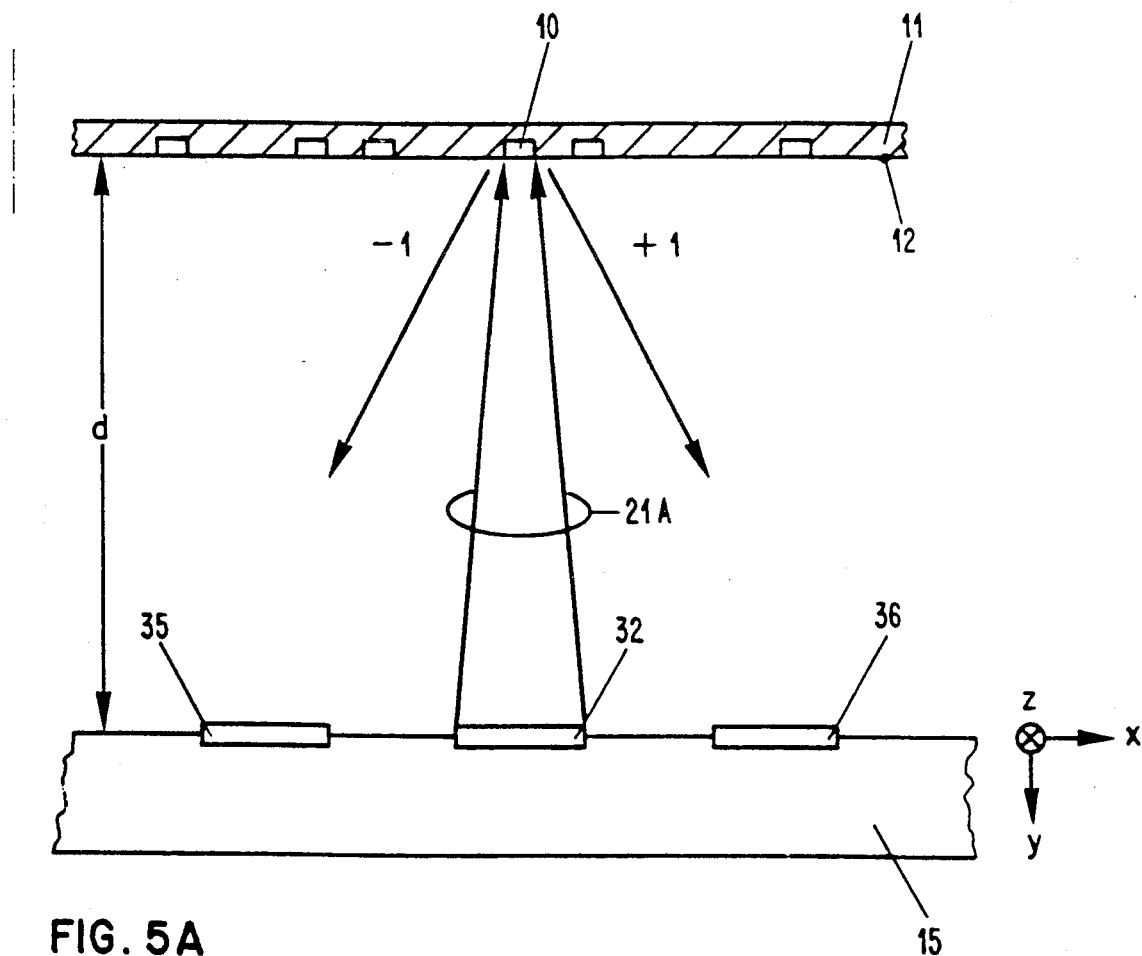
FIG. 5A is a schematic cross-sectional view of the tracking-error detection system of the first embodiment as illustrated in FIG. 4, where the optical disk is "in track"

By suitable design of the focusing grating coupler 32, the deflected beam 21A is focused onto the surface 12 of disk 11. If beam 21A, now illustrated by two arrows representing the outer rays of the beam, is focused to the center of pit 10, as shown in FIG. 5A, the pit causes a diffraction of the reflected beam. First order side lobes, $-1$ and $+1$, are coupled back into waveguides 46.1 and 46.2, via grating couplers 35 and 36. Receiving grating coupler 35 has to be placed on one side of focusing grating coupler 32 and grating coupler 36 on the opposite side of coupler 32, both of them having equal distance from coupler 32. In addition, the three couplers are placed along a straight line perpendicular to the tracks with the disk rotating in the x-z plane, as shown in FIG. 5A, the straight line running parallel to the x-axis. The couplers have to be placed such that they are able to receive the side lobes with maximum efficiency so as to improve the S/N ratio and the error detection accuracy. The optimized configuration depends on variables such as the position of focus point 19, distance d between disk and head, and the angle of the side lobes with respect to the incident beam. Max Born has edited different books relating to such diffraction optics and geo- metric optics. One example is the book "Optik, Ein Lehrbuch der elektromagnetischen Lichttheorie," published by Springer Verlag, 3ed, 1985. Chapter 3 of the book "Principles of Optical Disk Systems," published by G. Bouwhuis et al., relates to this Vector Theory of Diffraction.

Figure 5B:
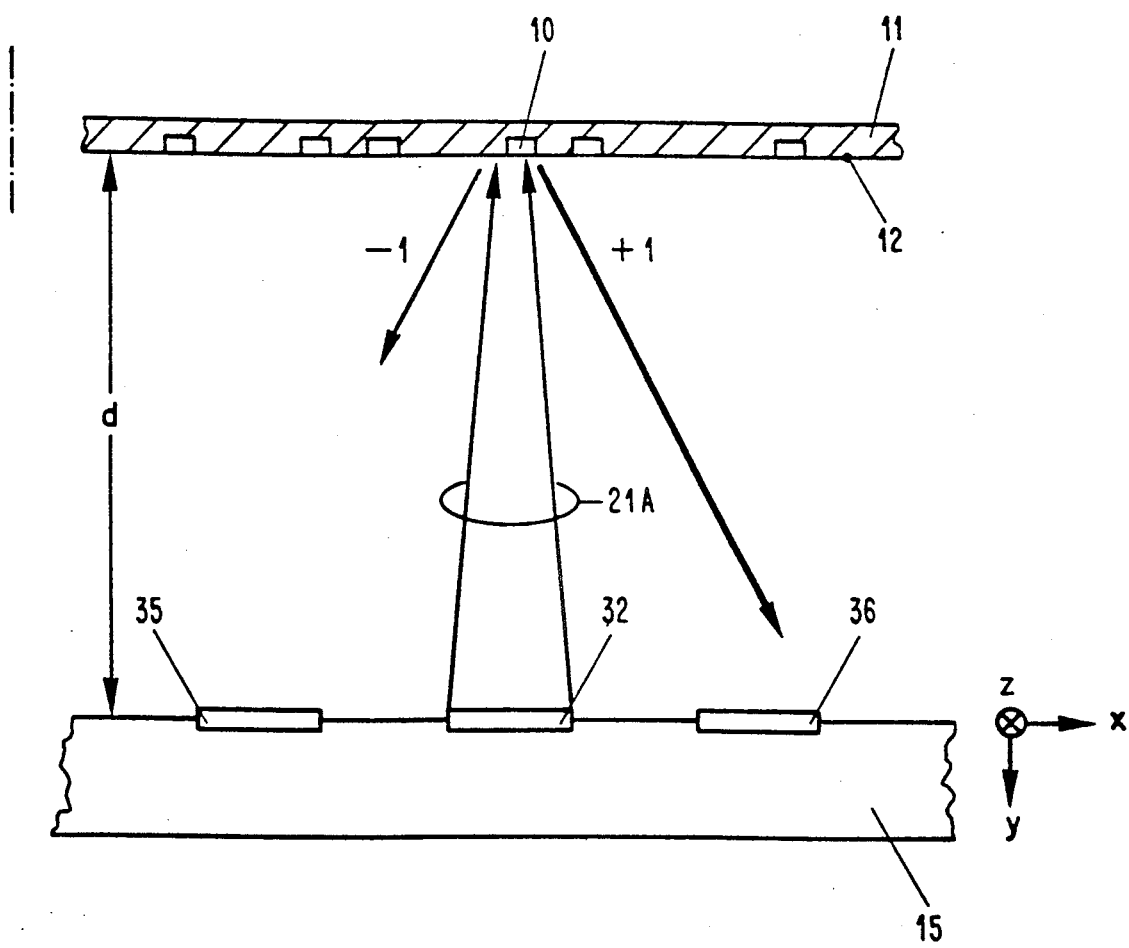
FIG. 5B is a schematic cross-sectional view of the tracking-error detection system as illustrated in FIG. 5A, where the optical disk is "out of track"

FIG. 5A illustrates the combined readout and tracking-error detection system of the device illustrated in FIG. 4 and shows the situation where the optical head 15 is "in track." This means that the scanning beam 21A is centered with respect to pit 10. In this case both grating couplers 35 and 36 are receiving approximately the same amount of light which is guided to photodetectors 38 and 39 where the light portions are transformed into electric signals. FIG. 5B illustrates the same system with semiconductor head 15 "out of track." A tracking-error causes an asym- metry of the diffraction pattern. The energies of the plus and minus first-order side lobes are not equal, shown as arrows of different length and thickness, and the resulting electric signals of the photodetectors 38 and 39 differ.

Figure 6:
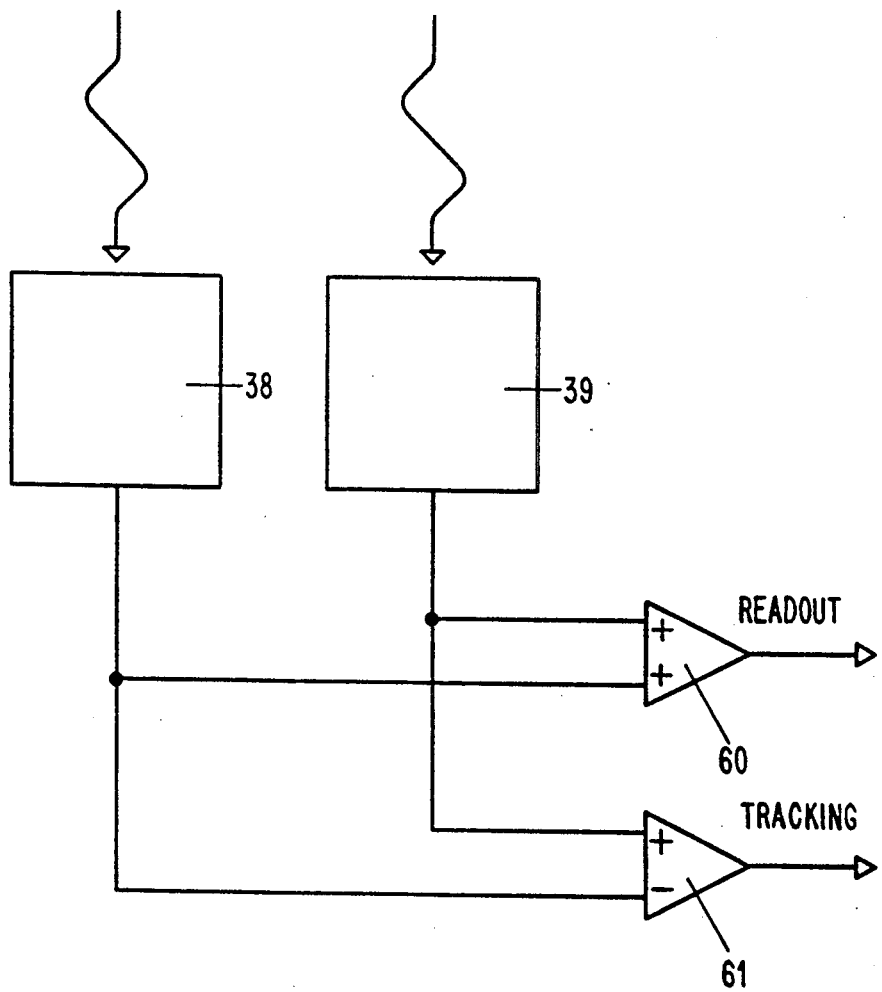
FIG. 6 is a block diagram of an analyser circuit comprising operational amplifieres providing the output signals of the combined readout and tracking- error detection system.

FIG. 6 gives a block diagram of an analyser circuit generating the output signals of system 44. When the system is in track (FIG. 5A), both plus and minus first-order side lobes, have the same energy and the photocurrents in order of the detectors 38 and 39 are equal. Operational amplifier 61 substracts the photocurrents to generate the tracking-error signal. If the tracking-error signal is zero, the system is in track whereas a signal other than zero indicates that the system is out of track. The sign of the tracking-error signal indicates the direction of the correct- ion. The readout signal is generated by adding the photocurrents using operational amplifier 60. Conditioning circuits can be employed to allow for zero- and offset- adjustment.

FOCUSING-ERROR DETECTION SYSTEM 45

Figure 8:
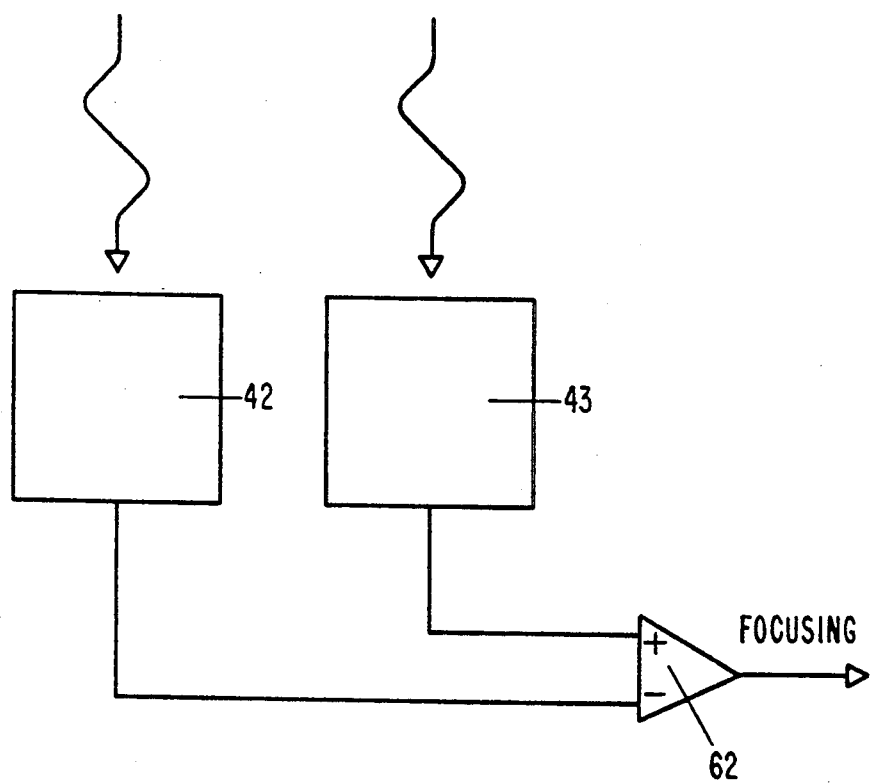
FIG. 8 is a block diagram of an analyser circuit comprising an operational amplifier for generating the output signal of the focusing-error detection system.

Focusing-error detection system 45 generates the focusing-error signal simultaneous to the above described combined readout and tracking-error signal. Separate focusing grating coupler 33 deflects the lightwave out from the waveguide onto the surface of the optical-storage medium as illustrated by arrow 20A, FIG. 3. Beam 20A is focused onto the surface between two tracks. The reflected portion thereof, 20B, is coupled back into the device via grating couplers 40 and 41. The couplers of the focusing- error detection system have to be placed along a straight line with both receiving gratings on one side of the focusing grating coupler 33. It is not neces- sary that the couplers of the focusing system 45 are oriented along a straight line perpendicular to the tracks. Different configurations of the optical elements are conceivable. However the receiving grating couplers 40 and 41 have to be optically separated which, in the described embodiment, is achieved with an etched groove 71 between these couplers. The focusing-error signal is generated by substracting the two photocurrents of photodetectors 42 and 43 using operational amplifier 62, as shown in FIG. 8.

Figure 7A:
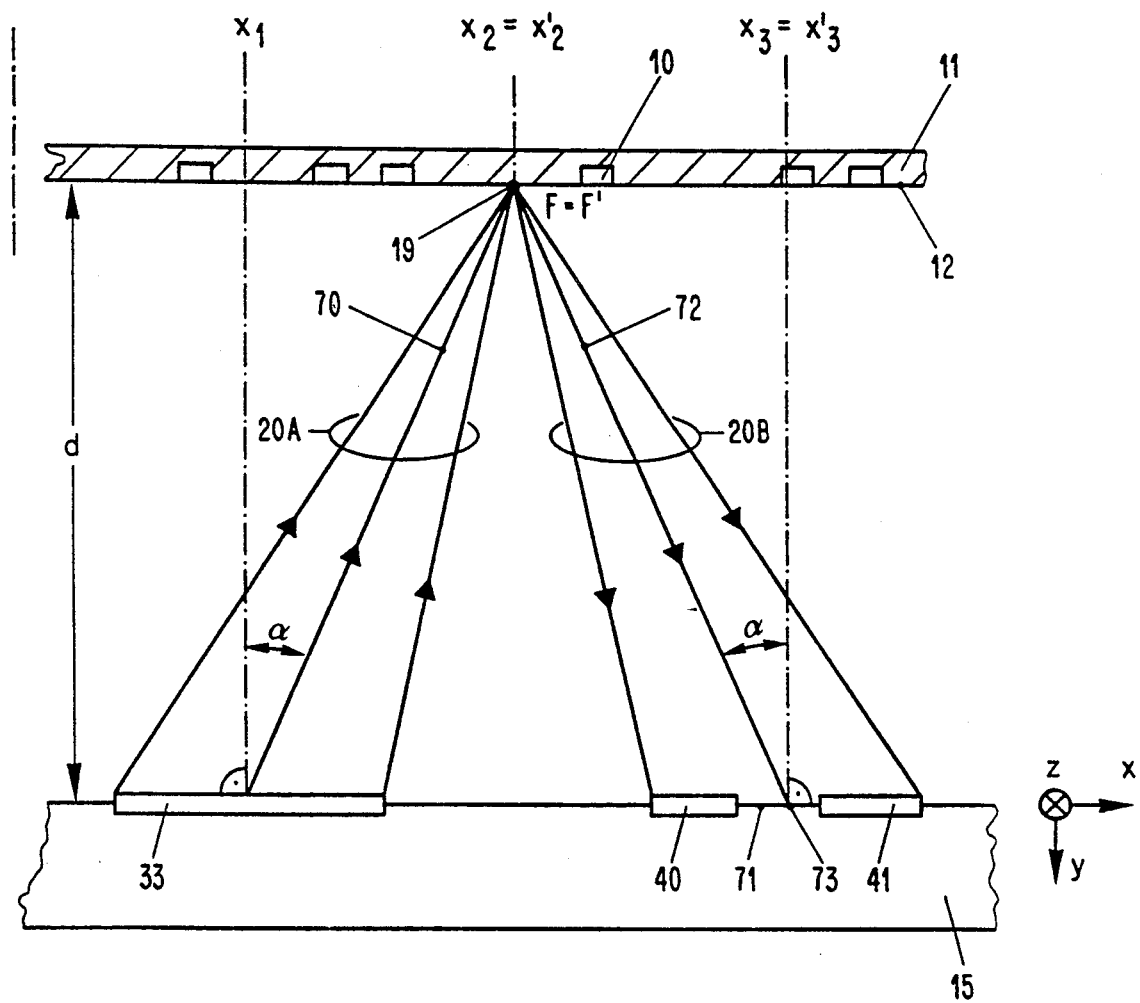
FIG. 7A is a schematic cross-sectional view of the focusing-error detection system of the first embodiment as illustrated in FIG. 4, and of an optical disk, where the optical disk is "in focus"
Figure 7B:
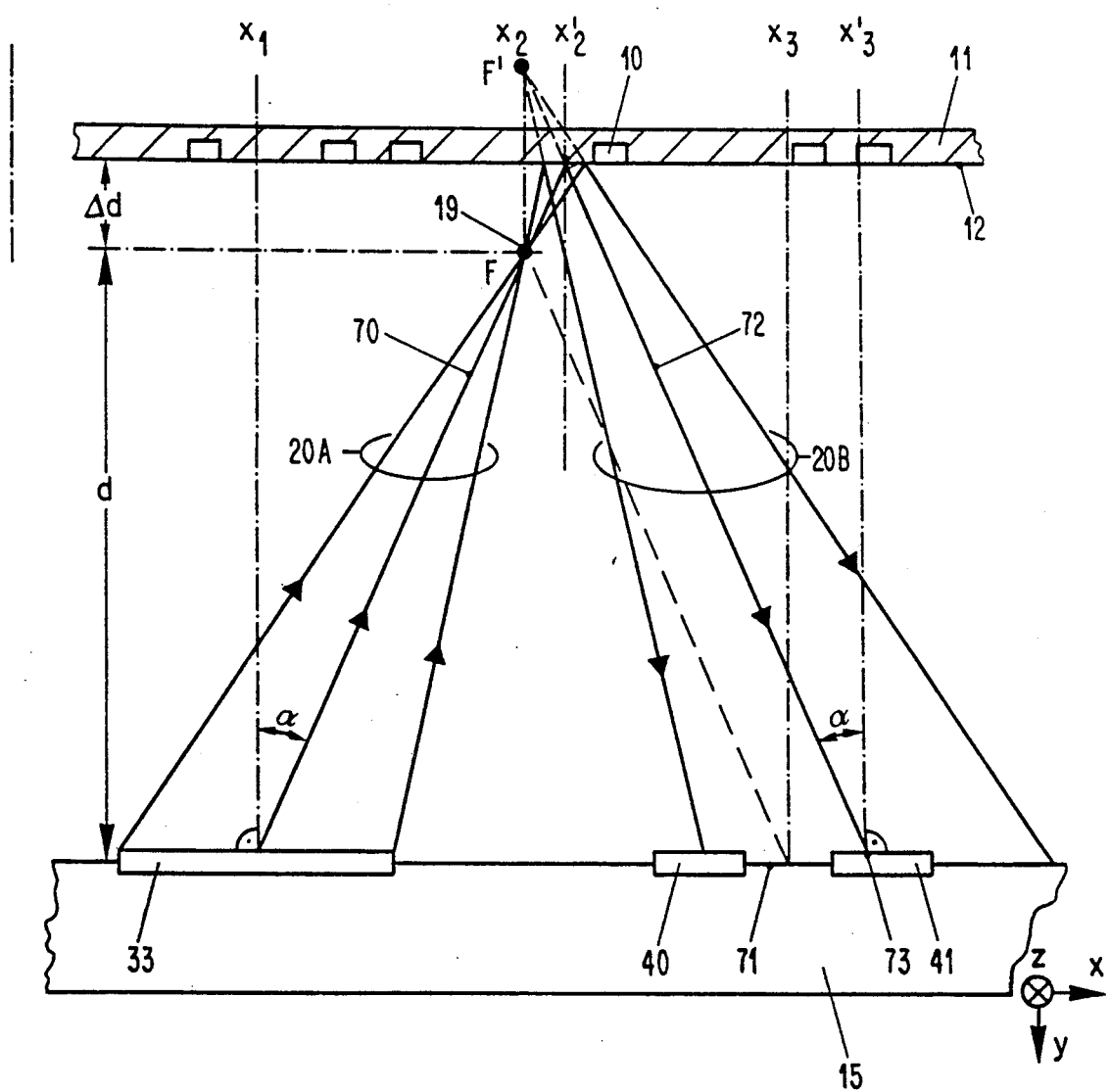
FIG. 7B is a schematic cross-sectional view of the focusing-error detection system as illustrated in FIG. 7A, and of an optical disk, where the optical disk is above the focus point.
Figure 7C:
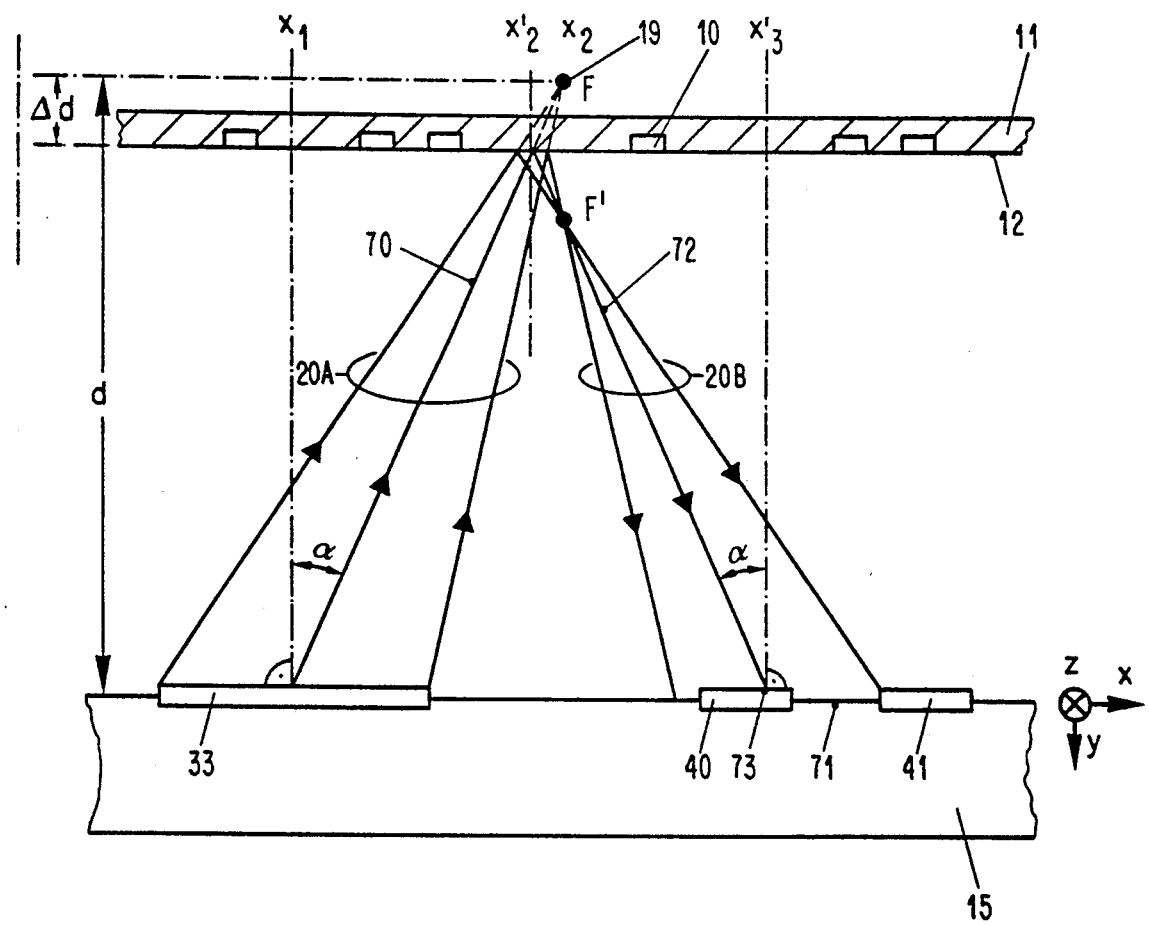
FIG. 7C is a schematic cross-sectional view of the focusing-error detection system as illustrated in FIG. 7A, and of an optical disk, where the optical disk is below the focus point.

FIG. 7A to 7C show sectional views of the focusing-error detection system 45. As long as the disk surface is in the focus point 19 of beam 20A as illustrated in FIG. 7A, both receiving grating couplers 40 and 41, are detecting nearly the same intensity of light. However, whenever the disk is out of focus, as illustrated in FIG. 7B and FIG. 7C, the grating couplers receive different amounts of light.

The geometric dimensions of the described embodiments depend on different variables. As one example, a short estimation of the required distance between focusing grating coupler 33 and grating couplers 40 and 41 is given below where d is the distance between head 15 and focus point 19. If the distance between head 15 and information recording surface 12 equals d, the disk is in focus, as shown in FIG. 7A. If the angle between principle ray 70 of beam 20A and a normal raised on the device surface is $\alpha$, the distance between $X_1$ and $X_2$, FIG. 7A, can be determined from the following equation:

$$|X_1 - X_2|^2 = d^2(1/(1-\sin^2\alpha) - 1) \qquad (1)$$

Again referring to FIG. 7A, the distance between $X_1$ and $X_3$ is important for the position of grating couplers 40 and 41 with respect to focusing grating coupler 33. It is determined by:

$$|X_1 - X_3| = 2|X_1 - X_2| \qquad (2)$$

When the distance between head and disk increases or decreases, i.e., if the disk is out of focus, as shown in FIG. 7B and FIG. 7C, the foot 73 of principle ray 72, coordinate $X_3'$, shifts along the x-axis. If the information recording surface 12 is above focus point 19, the foot 73 of principle ray 72 moves to the right and if the distance between information record- ing surface and device becomes smaller, foot point 73 moves to the left. The distance between $X_1$ and $X_3'$ can be determined with the following two equations, wherein $\bigcirc d$ is the amplitude of aberration from the ideal position shown in FIG. 7A:

Disk above focus point 19, FIG. 7B:

$$|X_1 - X_3'|^2 = 2(d + \bigcirc d)^2((1/\cos^2\alpha) - 1) \quad (3)$$

Disk below focus point 19, FIG. 7C:

$$|X_1 - X_3'|^2 = 2(d - \bigcirc d)^2((1/\cos^2\alpha) - 1) \quad (4)$$

If the maximum amplitude of aberration $\bigcirc d$, distance d, and angle $\alpha$ are known, it is possible to optimize the arrangement of the grating couplers. Further detailed calculations depend on the design of the grating couplers, on the wavelength of the laser beam, on the waveguide material used, etc.

A second embodiment of the invention employing an interferometric focusing-error detection system which improves the error detection accuracy, is described below.

Figure 9:
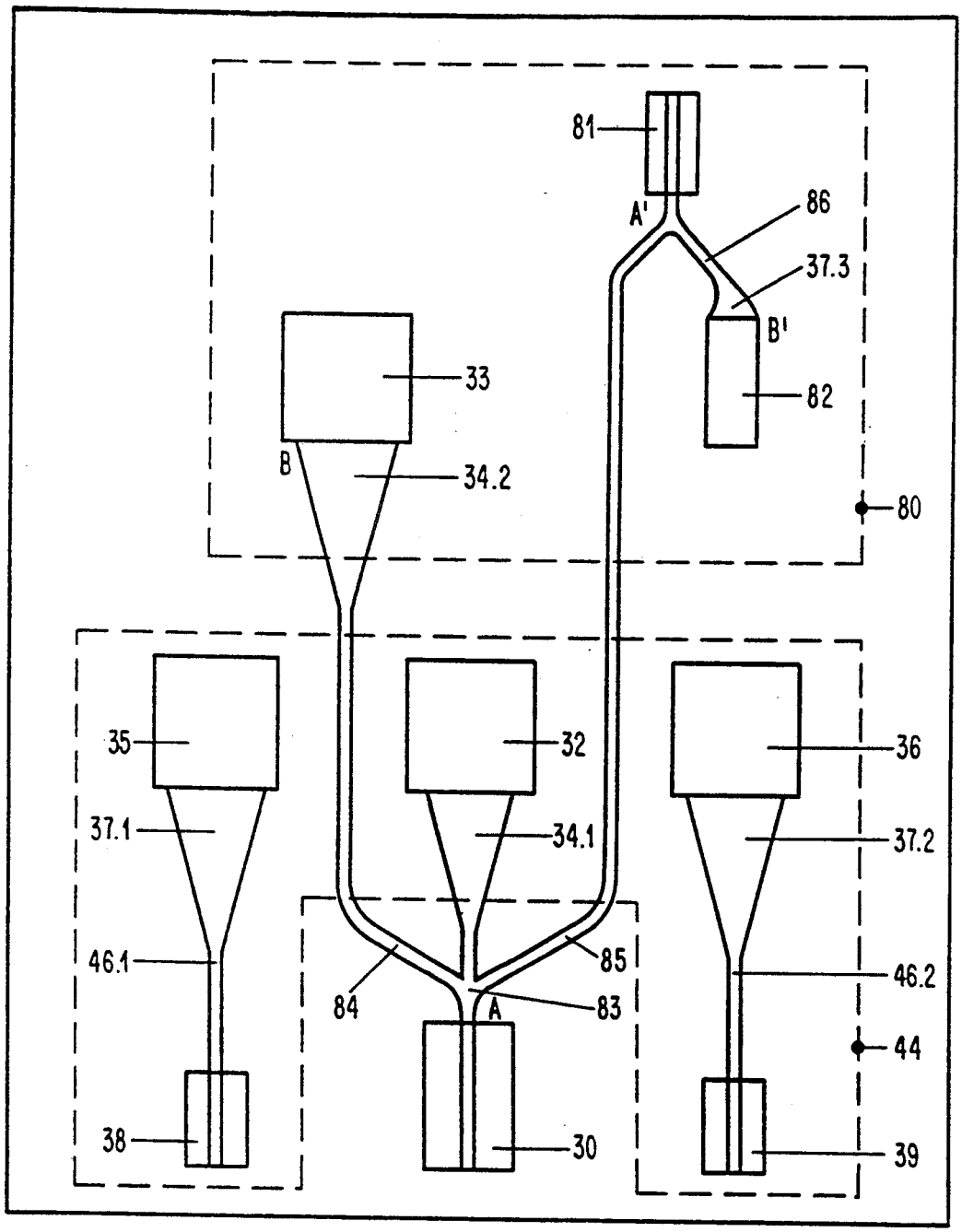
FIG. 9 is a schematic view of a second embodiment of the optical head of the present invention in which an interferometric focusing-error detection system is integrated.

As shown in FIG. 9, an interferometric focusing-error detection system 80 has replaced the coarse focusing-error detection system 45 of FIG. 4. This Mach-Zehnder interferometric focusing-error detection system is capable of resolving a half-wavelength shift with respect to the distance d between the semicon- ductor optical head structure and disk.

An interferometer usually superposes two lightwaves emitted from the same light source. The emitted lightwave is split into at least two portions and travels along different paths of different length. Finally, both waves have to be optically superposed to generate an interferometric pattern which contains information about the path length difference. If one path has a fixed length, it is possible to determine the unknown length of the second path.

Figure 10:
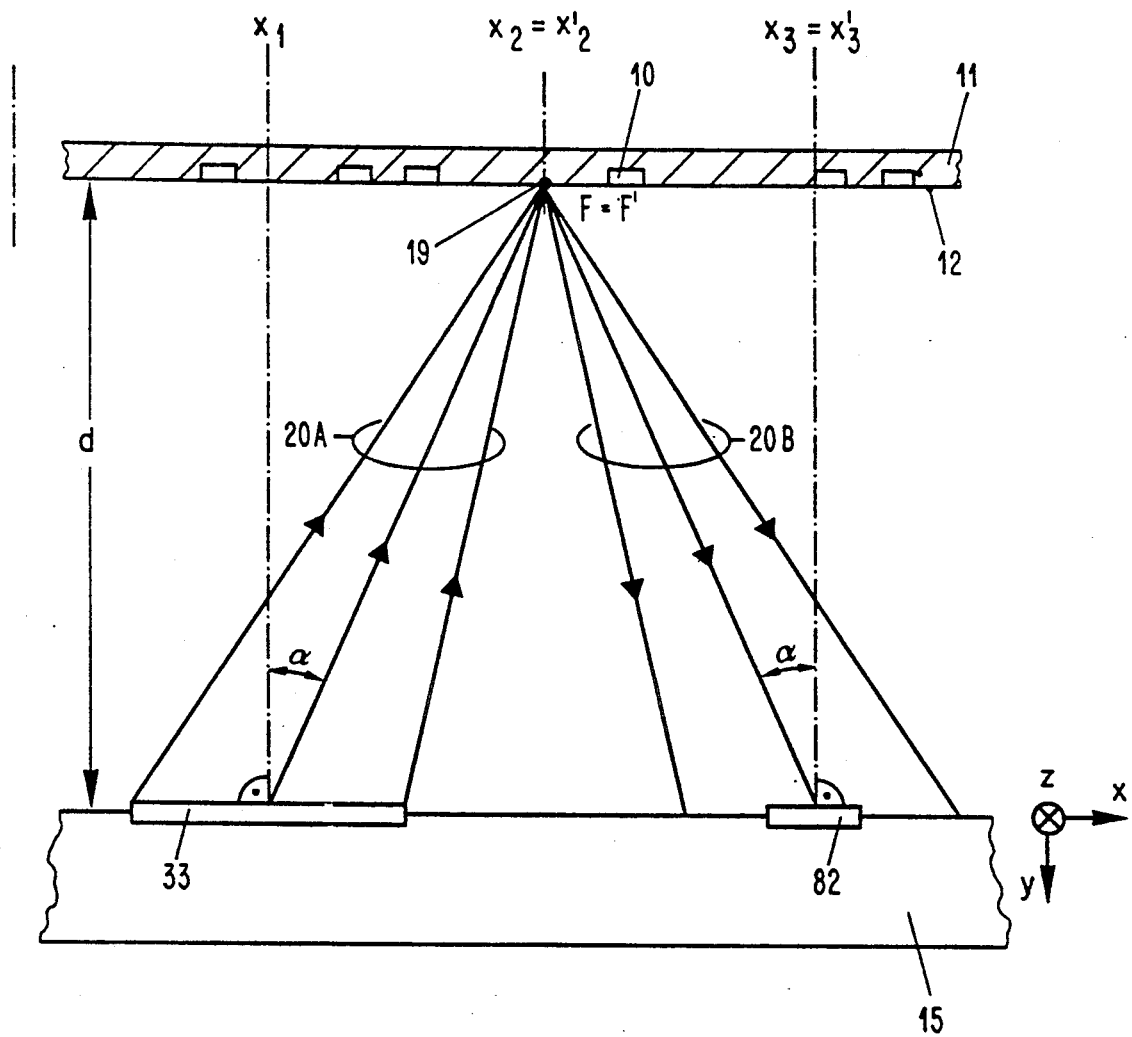
FIG. 10 is a schematic cross-sectional view of the interferometric focusing-error detection system as illustrated in FIG. 9, and of an optical disk, when the optical disk is "in focus"

The interferometric focusing-error detection system 80 consists of a fixed length waveguide path and a path of unknown length. The fixed length path is formed by the waveguide branch 85, extending from A to A' feeding the lightwave to a photodetector 81. The variable path is designated with the marks A-B-B'-A'. Section B-B' is the free path of unknown length to the disk and back to the receiving grating 82. FIG. 10 illustrates the free path between focusing grating coupler 33 and grating coupler 82, its variable length depending on the distance d between information recording surface 12 and head 15. Photodetector 81 superposes both lightwaves to form an interference pattern resulting in an intensity variation in the detector. The interference pattern permits good control if waveguide branches 85 and 86 feed approximately the same energy into photodetector 81. By suitable design of waveguide branches 84 and 85 it is possible to split the lightwave into portions with different energies, resulting in equal energies at the photodetector, which is a presupposition for sharp interference pattern. The photocurrent of photodetector 81 can be amplified to improve the detection of small intensity variations. However, the above described interferometric focusing-error detection system 80 can not be realized within head structures as shown in the prior art known to the applicant.

In the complete optical head, the just described interferometric focusing-error detection system 80 can be combined with the readout and tracking-error detection system 44 described in context with the first embodiment of the invention.

Figure 11:
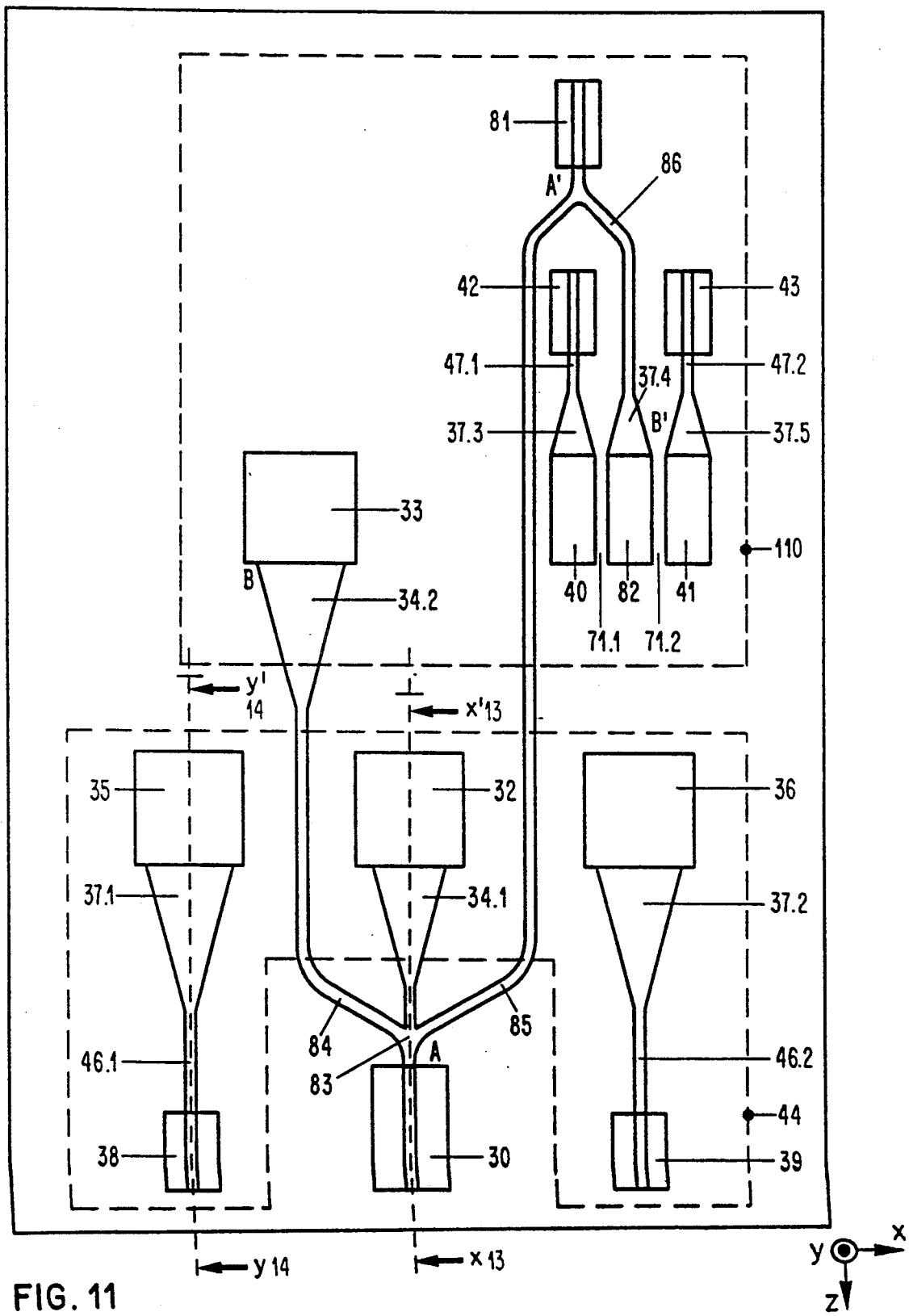
FIG. 11 is a schematic view of a third embodiment of the optical head of the present invention compris- ing a coarse and a fine focusing-error detection system.
Figure 12:
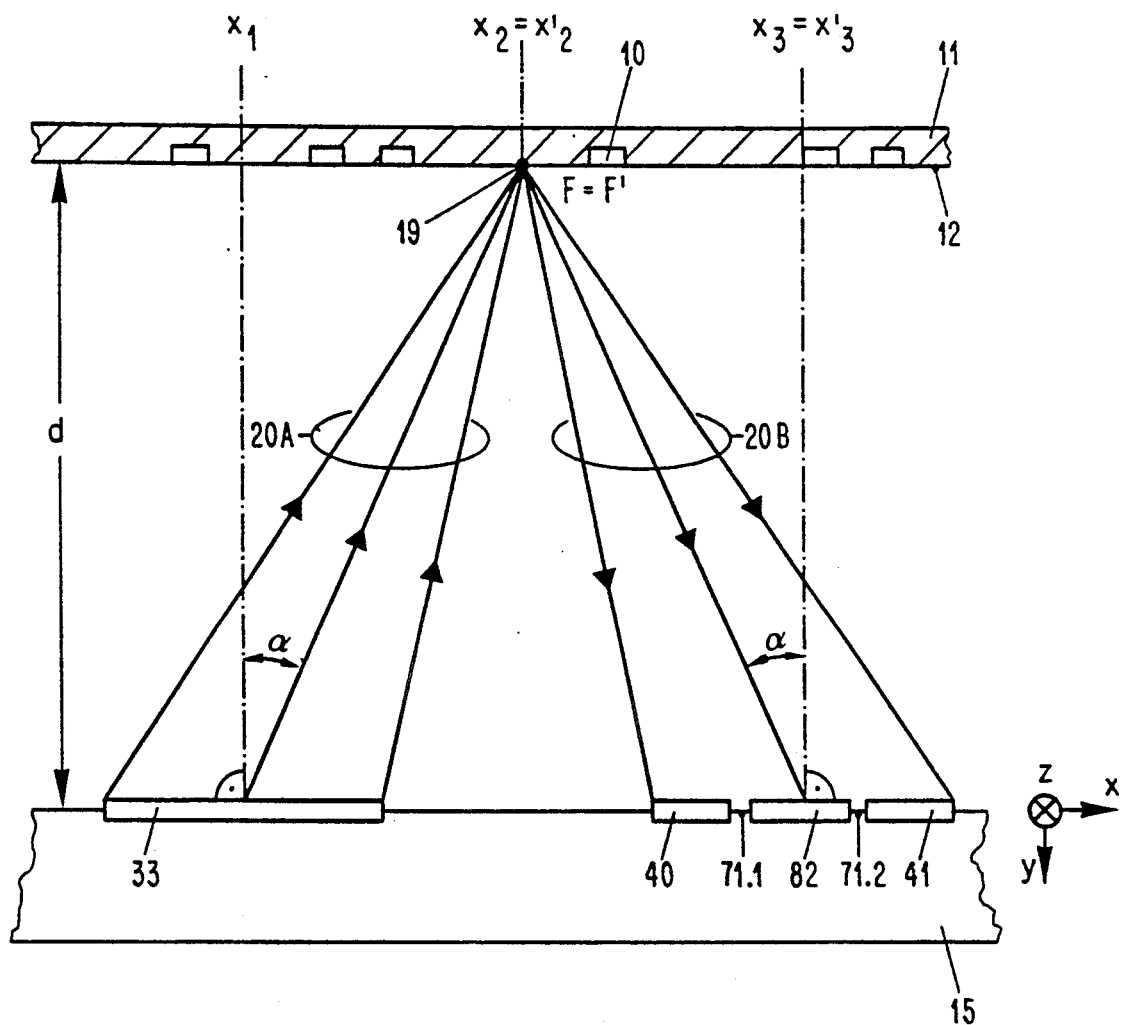
FIG. 12 is a schematic cross-sectional view of the coarse and fine focusing-error detection system illustrated in FIG. 11, and of an optical disk, where the optical disk is "in focus"

A third embodiment of the invention, shown in FIG. 11, employs a coarse and a fine focusing-error detection system 110. System 110 is composed of the two focusing-error detection systems as described in context with the first and second embodiment, respect-ively, both operating simultaneously. By suitable design of an analyser and regulation circuit and the employment of a special electro-magnetic mechanism for moving semiconductor optical head 15, it is possible to improve error detection accuracy and to shorten the time necessary for the regulation of the head position. FIG. 12 illustrates a sectional view of the coarse and fine focusing-error detection system 110 of the third embodiment. Etched grooves 71.1 and 71.2 are formed between the receiving grating couplers.

In the complete optical head, the just described coarse and fine focusing-error detection system 110 can be combined with the readout and tracking-error detection system 44 described in context with the first embodiment of the invention.

Figure 13:
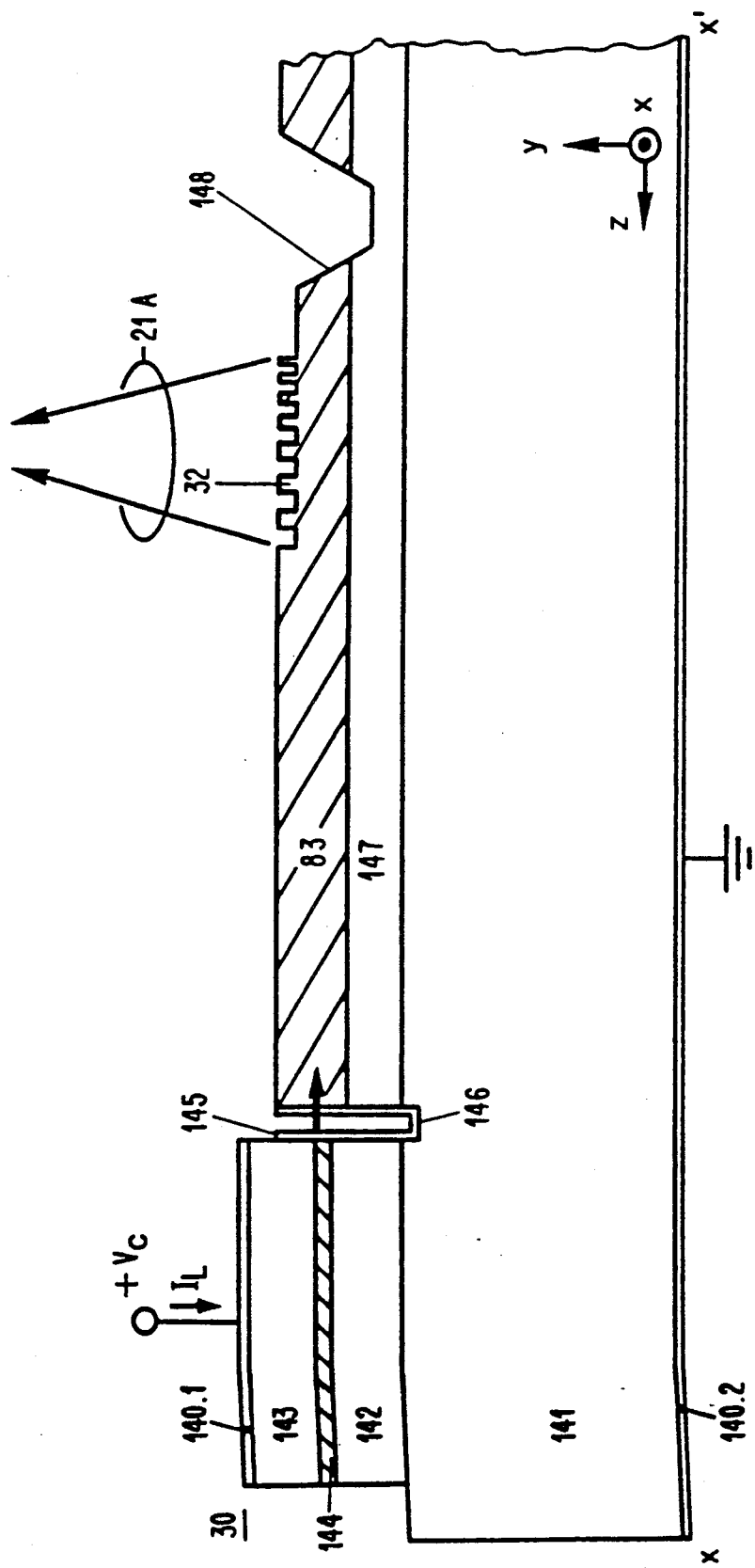
FIG. 13 is a schematic and largely simplified cross-sectional view of a device similar to the device illustrated in FIG. 11, cut along line X—X'.
Figure 14:
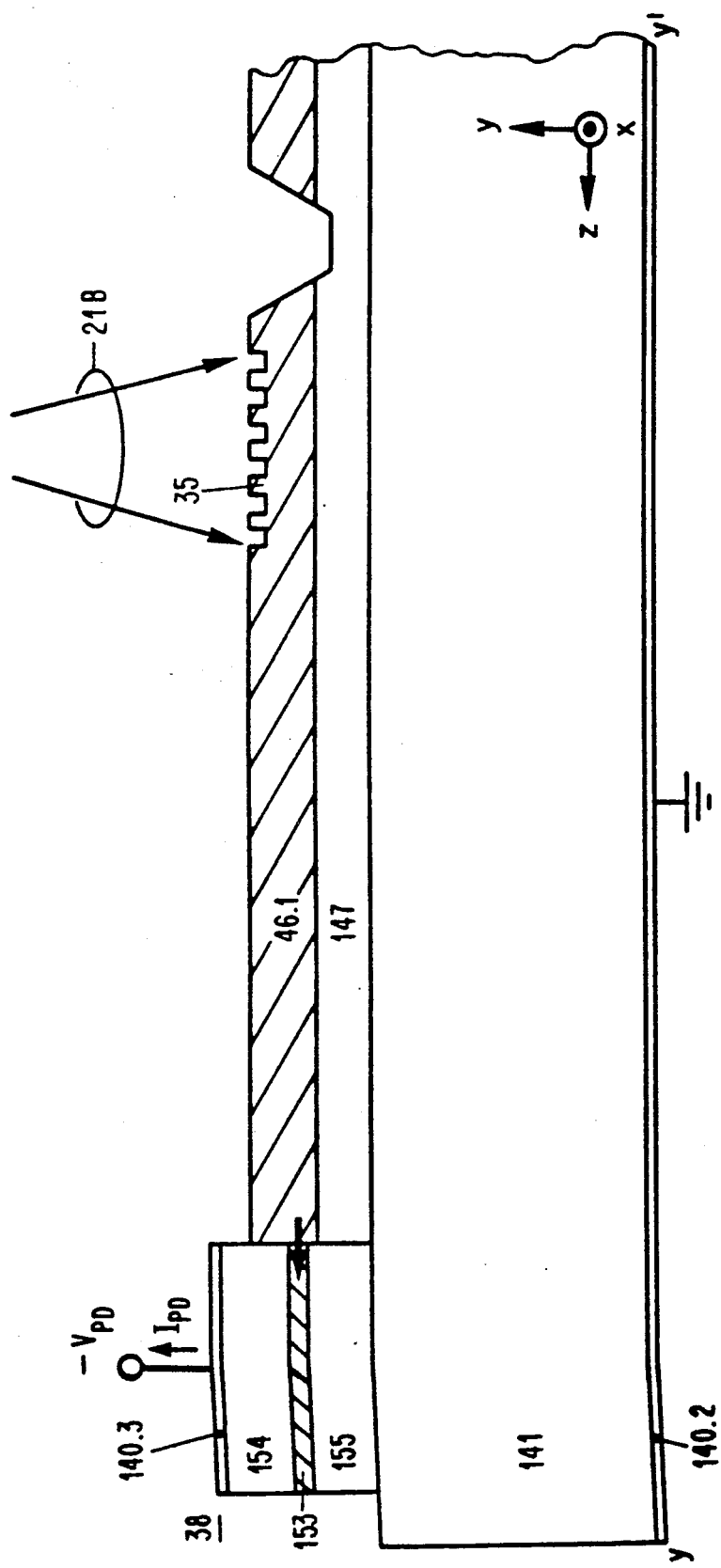
FIG. 14 is a schematic and largely simplified cross-sectional view of a device similar to the device illustrated in FIG. 11, cut along line Y—Y'.

The following FIGS. 13 and 14 show more detailed cross-sectional views of the device illus- trated in FIG. 11. Both figures show a semiconductor optical head structure formed on GaAs substrate 141 using planar fabrication technology. FIG. 13 shows a cut of the head illustrated in FIG. 11, from X to X'. A p-n junction laser 30, consisting of two cladding layers 142 and 143, and an active layer 144, is emitting a lightwave, when a forward bias $+V_C$ is applied to the p-n junction of the structure via metal contacts 140.1 and 140.2 causing a laser current $1_L$ to flow. The lightwave is fed via an etched groove 146, forming the laser mirror, into a waveguide core 83 formed on a cladding layer 147. The walls of the etched groove are treated with an antireflecting coating 145. A focusing grating coupler 32 is etched into the waveguide core and deflects the lightwave out from there. An etched groove 148 of suitable design absorbs the portion of the lightwave which has passed the focusing grating coupler 32.

FIG. 14 shows a cut across the detecting part of the optical pickup device illustrated in FIG. 11, from Y to Y'. Beam 21B is coupled back into a waveguide core 46.1 which feeds the lightwave into a light- sensitive element. As a light sensitive element, photodiode 38 is employed. The photodiode has the same structure as the laser shown in FIG. 13, but is reverse polarized, $-V_{PD}$, to generate the photo current $1_{PD}$. The "active" layer 153 is embedded between two cladding layers 154 and 155 and metal contacts 140.2 and 140.3. The photodiode converts the lightwave to a photo current $1_{PD}$.

Further details about lasers, photo diodes and waveguides could be taken from different books and technical papers known in the art. S. M. Sze, for example, has edited the book "Physics of Semiconductor Devices," John Wiley and Sons, 2nd. edition, and M. J. Howes et al have edited the book "Gallium Arsenide, Materials, Devices, and Circuits," same publisher, which both are representative for the literature known in the art, and relate to optical elements.

Different variations of the above described devices are conceivable. The integrated optical elements can be adapted to meet different require- ments. The simple laser structure presented in FIG. 13 can be replaced by a single quantum well GRINSCH- laser and the waveguide can be realized as a ridge waveguide for example. An external laser can be employed using fibres or waveguides for coupling the lightwave into the optical head. Furthermore it is possible to employ light-sensitive elements, which can replace the receiving grating couplers, waveguides and photo diodes. By suitable design of such light-sensitive elements, which have to detect light perpen-dicular to the layers of said elements, a further reduction of size is conceivable. In addition it is possible to replace the focusing grating couplers by prism couplers in combination with focusing lenses or by simple grating couplers in combination with focusing lenses.

The described optical head structures can also be used for writing, erasing, and reading of information if the corresponding storage-medium is a phase change medium for example. Different laser powers are then required for writing, erasing, and reading.

We claim:

1. An integrated optical head structure for reading stored data stored in storage locations on an optical-storage medium with simultaneous tracking-error and focusing-error detection, characterized in that it comprises: a laser for generating a single beam for combined storage location access and tracking-error detection, and focusing-error detection, a waveguide network of optical components containing at least one beam splitter for guiding said single beam and for splitting said beam into at least two separate beam portions, light-deflecting means for deflecting said beam portions out from said waveguide network and for focusing it onto the surface of said optical storage-medium from where they are at least partially reflected, and light-detecting means for detecting the reflected beam portions, and electrical means, connected to said light detecting means, for generating electric output signals representative of said stored data, a tracking-error signal, and a focusing-error signal, wherein said waveguide network, said light-deflecting means, and said light-detecting means are integrated on a common semiconductor structure, and wherein a first optical path of a first beam portion and a first set of electrical elements used to obtain and process said electric output signals representative of said stored data and said tracking-error signal are substantially separated from a corresponding second optical path and a second set of electrical elements used to obtain and process said focusing-error signal in order to avoid any mutual interference.

2. An integrated optical head structure as in claim 1, wherein said laser is integrated on said common semiconductor structure.

3. An integrated optical head structure as in claim 2, wherein said light-deflecting means are focusing grating couplers formed on said waveguide network, and wherein said light-detecting means comprise a grating coupler, a waveguide, and a light-sensitive element, arranged such that a reflected beam portion reaching said grating coupler is coupled into said light-sensitive element via said waveguide.

4. An integrated optical head structure according to claim 3, wherein said waveguide network splits said single beam into two separate beam portions, a first beam portion guided via a first waveguide branch to a combined storage location access and tracking-error detection system, and a second beam portion guided via a second waveguide branch to a focusing-error detection system.

5. An integrated optical head structure as in claim 4, wherein said combined storage location access and tracking-error detection system comprises: a focusing grating coupler for deflecting said first beam portion out from said first waveguide branch of said waveguide network and for focusing it onto the surface of said optical storage medium from where it is at least partially reflected, and two grating couplers, two waveguides and two photo detectors, a first of said grating couplers coupling a first part of said reflected beam portion via a first of said waveguides into a first of said photodetectors, a second of said grating couplers coupling a second part of said reflected beam portion via a second of said waveguides into the second of said photodetectors, said photo detectors generating said electric output signals of said combined storage location access and tracking-error detection system, and wherein said focusing-error detection system comprises a focusing grating coupler, for deflecting said second beam portion out from said second waveguide branch of said waveguide network and for focusing it onto the surface of said optical storage medium from where it is at least partially reflected, and two grating couplers, two waveguides, and two photo detectors, a first of said grating couplers coupling a first part of said reflected beam portion via a first of said waveguides into a first of said photo detectors, a second of said grating couplers coupling a second part of said reflected beam portion via a second of said waveguides into a second of said photo detectors, said photo detectors generating said electric output signals of the focusing-error detection system.

6. An integrated optical head structure as in claim 5, wherein said waveguide network is connected via horn feeds to said first and second focusing grating couplers, and wherein all grating couplers are connected via horn feeds to their associated waveguides.

7. An integrated optical head structure as in claim 5, wherein said two grating couplers and said focusing grating coupler of said combined storage location access and tracking-error detection system are placed along a straight line perpendicular to the tracks of said optical-storage medium, said first grating coupler being placed on one side of said focusing grating coupler and said second grating coupler on a second side of said focusing grating coupler opposite said first side, both at an equal distance to said focusing grating coupler, said grating couplers being placed such that both are detecting nearly the same amount of light when said optical-storage medium is in track, and that both are detecting different amounts of light when said optical-storage medium is not in track, and wherein said two grating couplers and said focusing grating coupler of said focusing-error detection system are placed along a straight line, both on one side of said focusing grating coupler, said grating couplers being placed such that both are detecting nearly the same amount of light when said optical-storage medium is in focus, and that both are detecting different amounts of light when said optical-storage medium is out of focus.

8. An integrated optical head structure as in claim 6, wherein said two grating couplers and said focusing grating coupler of said combined storage location access and tracking-error detection system are placed along a straight line perpendicular to the tracks of said optical-storage medium, said first grating coupler being placed on one side of said focusing grating coupler and said second grating coupler on a second side of said focusing grating coupler opposite said first side, both at equal distance to said focusing grating coupler, said grating couplers being placed such that both are detecting nearly the same amount of light when said optical-storage medium is in track, and that both are detecting different amounts of light when said optical-storage medium is not in track, and wherein said two grating couplers, and said focusing grating coupler of said focusing-error detection system are placed along a straight line, both on one side of said focusing grating coupler, said grating couplers being placed such that both are detecting nearly the same amount of light when said optical-storage medium is in focus, and that both are detecting different amounts of light when said optical-storage medium is out of focus.

9. An integrated optical head structure as in claim 3, wherein said light-deflecting means are focusing grating couplers formed on said waveguide network, and wherein said light-detecting means comprise a grating coupler, a waveguide, and a light-sensitive element, arranged such that a reflected beam portion reaching said grating coupler is coupled into said light-sensitive element via said waveguide.

10. An integrated optical head structure according to claim 9, wherein said waveguide network splits said single beam into two separate beam portions, a first portion guided via a first waveguide branch to a combined storage location access and tracking-error detection system, and a second portion guided via a second waveguide branch to a focusing-error detection system.

11. An integrated optical head structure as in claim 10, wherein said combined storage location access and tracking-error detection system comprises: a focusing grating coupler for deflecting said first beam portion out from said first waveguide branch of said waveguide network and for focusing it onto the surface of said optical storage medium from where it is at least partially reflected, and two grating couplers, two waveguides and two photo detectors, a first of said grating couplers coupling a first part of said reflected beam portion via a first of said waveguides into a first of said photodetectors, a second of said grating couplers coupling a second part of said reflected beam portion via a second of said waveguides into the second of said photodetectors, said photo detectors generating said electric output signals of the combined storage location access and tracking-error detection system, and wherein said focusing error detection system comprises a focusing grating coupler for deflecting said second beam portion out from said second waveguide branch of said waveguide network and for focusing it onto the surface of said optical storage medium from where it is at least partially reflected, and two grating couplers, two waveguides, and two photo detectors, a first of said grating couplers coupling a first part of said reflected beam portion via a first of said waveguides into a first of said photo detectors, a second of said grating couplers coupling a second part of said reflected beam portion via a second of said waveguides into a second of said photo detectors, said photo detectors generating said electric output signals of the focusing-error detection system.

12. An integrated optical head structure as in claim 11, wherein said waveguide network is connected via horn feeds to said first and second focusing grating couplers, and wherein all grating couplers are connected via horn feeds to their associated waveguides.

13. An integrated optical head structure as in claim 11, wherein said two grating couplers and said focusing grating coupler of said combined storage location access and tracking-error detection system are placed along a straight line perpendicular to the tracks of said optical-storage medium, said first grating coupler being placed on one side of said focusing grating coupler and said second grating coupler on a second side of said focusing grating coupler opposite said first side, both at an equal distance to said focusing grating coupler, said grating couplers being placed such that both are detecting nearly the same amount of light when said optical-storage medium is in track, and that both are detecting different amounts of light when said optical-storage medium is not in track, and wherein said two grating couplers and said focusing grating coupler of said focusing-error detection system are placed along a straight line, both on one side of said focusing grating coupler, said grating couplers being placed such that both are detecting nearly the same amount of light when said optical-storage medium is in focus, and that both are detecting different amounts of light when said optical-storage medium is out of focus.

14. An integrated optical head structure as in claim 12, wherein said two grating couplers and said focusing grating coupler of said combined storage location access and tracking-error detection system are placed along a straight line perpendicular to the tracks of said optical-storage medium, said first grating coupler being placed on one side of said focusing grating coupler and said second grating coupler on a second side of said focusing grating coupler opposite said first side, both at an equal distance to said focusing grating coupler, said grating couplers being placed such that both are detecting nearly the same amount of light when said optical-storage medium is in track, and that both are detecting different amounts of light when said optical-storage medium is not in track, and wherein said two grating couplers and said focusing grating coupler of said focusing-error detection system are placed along a straight line, both on one side of said focusing grating coupler, said grating couplers being placed such that both are detecting nearly the same amount of light when said optical-storage medium is in focus, and that both are detecting different amounts of light when said optical-storage medium is out of focus.

15. An integrated optical head structure according to claim 2, wherein said waveguide network splits said single beam into two separate beam portions, a first portion guided via a first waveguide branch to a combined storage location access and tracking-error detection system, and a second portion guided via a second waveguide branch to a focusing-error detection system.

16. An integrated optical head structure as in claim 15, wherein said combined storage location access and tracking-error detection system comprises: a focusing grating coupler for deflecting said first beam portion out from said first waveguide branch of said waveguide network and for focusing it onto the surface of said optical storage medium from where it is at least partially reflected, and two grating couplers, two waveguides and two photo detectors, a first of said grating couplers coupling a first part of said reflected beam portion via a first of said waveguides into a first of said photodetectors, a second of said grating couplers coupling a second part of said reflected beam portion via a second of said waveguides into the second of said photodetectors, said photo detectors generating said electric output signals of said combined storage location access and tracking-error detection system, and wherein said focusing-error detection system comprises a focusing grating coupler, for deflecting said second beam portion out from said second waveguide branch of said waveguide network and for focusing it onto the surface of said optical storage medium from where it is at least partially reflected, and two grating couplers, two waveguides, and two photo detectors, a first of said grating couplers coupling a first part of said reflected beam portion via a first of said waveguides into a first of said photo detectors, a second of said grating couplers coupling a second part of said reflected beam portion via a second of said waveguides into a second of said photo detectors, said photo detectors generating said electric output signals of the focusing-error detection system.

17. An integrated optical head structure as in claim 16, wherein said waveguide network is connected via horn feeds to said first and second focusing grating couplers, and wherein all grating couplers are connected via horn feeds to their associated waveguides.

18. An integrated optical head structure as in claim 16, wherein said two grating couplers and said focusing grating coupler of said combined storage location access and tracking-error detection system are placed along a straight line perpendicular to the tracks of said optical-storage medium, said first grating coupler being placed on one side of said focusing grating coupler and said second grating coupler on a second side of said focusing grating coupler opposite said first side, both an at equal distance to said focusing grating coupler, said grating couplers being placed such that both are detecting nearly the same amount of light when said optical-storage medium is in track, and that both are detecting different amounts of light when said optical-storage medium is not in track, and wherein said two grating couplers and said focusing grating coupler of said focusing-error detection system are placed along a straight line, both on one side of said focusing grating coupler, said grating couplers being placed such that both are detecting nearly the same amount of light when said optical-storage medium is in focus, and that both are detecting different amounts of light when said optical-storage medium is out of focus.

19. An integrated optical head structure as in claim 17, wherein said two grating couplers and said focusing grating coupler of said combined storage location access and tracking-error detection system are placed along a straight line perpendicular to the tracks of said optical-storage medium, said first grating coupler being placed on one side of said focusing grating coupler and said second grating coupler on a second side of said focusing grating coupler opposite said first side, both at an equal distance to said focusing grating coupler, said grating couplers being placed such that both are detecting nearly the same amount of light when said optical-storage medium is in track, and that both are detecting different amounts of light when said optical-storage medium is not in track, and wherein said two grating couplers and said focusing grating coupler of said focusing-error detection system are placed along a straight line, both on one side of said focusing grating coupler, said grating couplers being placed such that both are detecting nearly the same amount of light when said optical-storage medium is in focus, and that both are detecting different amounts of light when said optical-storage medium is out of focus.

20. An integrated optical head structure according to claim 1, wherein a beam splitter component of said waveguide network splits said single beam into two separate beam portions, a first portion guided via a first waveguide branch to a combined storage location access and tracking-error detection system, and a second portion guided via a second waveguide branch to a focusing-error detection system.

21. An integrated optical head structure as in claim 20, wherein said combined storage location access and tracking-error detection system comprises: a focusing grating coupler for deflecting said first beam portion out from said first waveguide branch of said waveguide network and for focusing it onto a surface of said optical storage medium from where it is at least partially reflected, and two grating couplers, two waveguides and two photo detectors, a first of said grating couplers coupling a first part of said reflected beam portion via a first of said waveguides into a first of said photodetectors, a second of said grating couplers coupling a second part of said reflected beam portion via a second of said waveguides into a second of said photodetectors, said photo detectors generating said electric output signals of the combined storage location access and tracking-error detection system; and wherein said focusing-error detection system comprises a focusing grating coupler for deflecting said second beam portion out from said second waveguide branch of said waveguide network and for focusing it onto the surface of said optical storage medium from where it is at least partially reflected and two grating couplers, two waveguides, and two photo detectors, a first of said grating couplers coupling a first part of said reflected beam portion via a first of said waveguides into a first of said photo detectors, a second of said grating couplers coupling a second part of said reflected beam portion via a second of said waveguides into the second of said photo detectors, said photo detectors generating said electric output signals of said focusing-error detection system.

22. An integrated optical head structure as in claim 21, wherein said waveguide network is connected via horn feeds to said first and second focusing grating couplers, and wherein all grating couplers are connected via horn feeds to their associated waveguides.

23. An integrated optical head structure as in claim 21, wherein said two grating couplers and said focusing grating coupler of said combined storage location access and tracking-error detection system are placed along a straight line perpendicular to the tracks of said optical-storage medium, said first grating coupler being placed on one side of said focusing grating coupler and said second grating coupler on a second side of said focusing grating coupler opposite said first side, both at an equal distance to said focusing grating coupler, said grating couplers being placed such that both are detecting nearly the same amount of light when said optical-storage medium is in track, and that both are detecting different amounts of light when said optical-storage medium is not in track, and wherein said two grating couplers and said focusing grating coupler of said focusing-error detection system are placed along a straight line, both on one side of said focusing grating coupler, said grating couplers being placed such that both are detecting nearly the same amount of light when said optical-storage medium is in focus, and that both are detecting different amounts of light when said optical-storage medium is out of focus.

24. An integrated optical head structure as in claim 22, wherein said two grating couplers and said focusing grating coupler of said combined storage location access and tracking-error detection system are placed along a straight line perpendicular to the tracks of said optical-storage medium, said first grating coupler being placed on one side of said focusing grating coupler and said second grating coupler on a second side of said focusing grating coupler opposite said first side, both at an equal distance to said focusing grating coupler, said grating couplers being placed such that both are detecting nearly the same amount of light when said optical-storage medium is in track, and that both are detecting different amounts of light when said optical-storage medium is not in track, and wherein said two grating couplers and said focusing grating coupler of said focusing-error detection system are placed along a straight line, both on one side of said focusing grating coupler, said grating couplers being placed such that both are detecting nearly the same amount of light when said optical-storage medium is in focus, and that both are detecting different amounts of light when said optical-storage medium is out of focus.

25. An integrated optical head structure as according to claim 9, wherein said waveguide network splits said single beam into three separate beam portions, a first beam portion guided via a first waveguide branch of said waveguide network to a combined storage location access and tracking-error detection system, a second and a third beam portion guided via second and third waveguide branches of said waveguide network to a combined coarse and fine focusing-error detection system.

26. An integrated optical head structure as in claim 25, wherein said combined storage location access and tracking-error detection system comprises a focusing grating coupler for deflecting said fist beam portion out from said first waveguide branch of said waveguide network and for focusing it onto the surface of said optical storage medium from where it is at least partially reflected, and two grating couplers, two waveguides, and two photo detectors, a first of said grating couplers coupling a first part of said reflected beam portion via a first of said waveguides into a first of said photodetectors, a second of said grating couplers coupling a second part of said reflected beam portion via a second of said waveguides into a second of said photo-detectors, said photo detectors generating said electric output signals of the combined storage location access and tracking-error detection system; and wherein said combined coarse and fine focusing-error detection system comprises a focusing grating coupler for deflecting said second beam portion out from said second waveguide branch of said waveguide network and for focusing it onto the surface of said optical storage medium from where it is at least partially reflected and three grating couplers, two waveguides and a waveguide branch, and three photo detectors a first of said grating couplers coupling a first part of said reflected beam portion via a first of said waveguides into a first of said photo detectors, the second of said grating couplers coupling a second part of said reflected beam portion via a second of said waveguides into a second of said photo detectors, said photo detectors generating electric output signals of said coarse focusing-error detection part; and wherein a third of said grating couplers couples a third part of said reflected beam portion via said waveguide branch of said waveguide network into a third of said photo detectors where said third part of said reflected beam portion is optically superposed with said third beam portion of said single beam which is fed via said third branch of said waveguide network to said third of said photo detectors so that the superposition of both beam portions forms an interference pattern at the third of said photo detectors and thereby generating electric output signals of said fine focusing-error detection part.

27. An integrated optical head structure as in claim 26, wherein said first and second branches of said waveguide network are connected via horn feeds to said first and second focusing grating couplers, and wherein all grating couplers are connected via horn feeds to their associated waveguides.

28. An integrated optical head structure according to claim 3, wherein said waveguide network splits said single beam into three separate beam portions, a first beam portion guided via a first waveguide branch of said waveguide network to a combined storage locating access and tracking-error detection system, a second and a third beam portion guided via second and third waveguide branches of said waveguide network to a combined coarse and fine focusing-error detection system.

29. An integrated optical head structure as in claim 28, wherein said combined storage location access and tracking-error detection system comprises a focusing grating coupler for deflecting said first beam portion out from said first waveguide branch of said waveguide network and for focusing it onto the surface of said optical storage medium from where it is at least partially reflected, and two grating couplers, two waveguides, and two photo detectors, a first of said grating couplers coupling a first part of said reflected beam portion via a first of said waveguides into a first of said photodetectors, a second of said grating couplers coupling a second part of said reflected beam portion via a second of said waveguides into a second of said photo-detectors, said photo detectors generating said electric output signals of the combined storage location access and tracking-error detection system; and wherein said combined coarse and fine focusing-error detection system comprises a focusing grating coupler for deflecting said second beam portion out from said second waveguide branch of said waveguide network and for focusing it onto the surface of said optical storage medium from where it is at least partially reflected and three grating couplers, two waveguides and a waveguide branch, and three photo detectors a first of said grating couplers coupling a first part of said reflected beam portion via a first of said waveguides into a first of said photo detectors, the second of said grating couplers coupling a second part of said reflected beam portion via a second of said waveguides into a second of said photo detectors, said photo detectors generating electric output signals of said coarse focusing-error detection part; and wherein a third of said grating couplers couples a third part of said reflected beam portion via said waveguide branch of said waveguide network into a third of said photo detectors where said third part of said reflected beam portion is optically superposed with said third beam portion of said single beam which is fed via said third branch of said waveguide network to said third of said photo detectors so that the superposition of both beam portions forms an interference pattern at the third of said photo detectors and thereby generating electric output signals of said fine focusing-error detection part.

30. An integrated optical head structure as in claim 29, wherein said first and second branches of said waveguide network are connected via horn feeds to said first and second focusing grating couplers, and wherein all grating couplers are connected via horn feeds to their associated waveguides.

31. An integrated optical head structure according to claim 2, wherein said waveguide network splits said single beam into three separate beam portions, a first beam portion guided via a first waveguide branch of said waveguide network to a combined storage location access and tracking-error detection system, a second and a third beam portion guided via second and third waveguide branches of said waveguide network to a combined coarse and fine focusing-error detection system.

32. An integrated optical head structure as in claim 31, wherein said combined storage location access and tracking-error detection system comprises a focusing grating coupler for deflecting said first beam portion out from said first waveguide branch of said waveguide network and for focusing it onto the surface of said optical storage medium from where it is at least partially reflected, and two grating couplers, two waveguides, and two photo detectors, a first of said grating couplers coupling a first part of said reflected beam portion via a first of said waveguides into a first of said photodetectors, a second of said grating couplers coupling a second part of said reflected beam portion via a second of said waveguides into a second of said photodetectors, said photo detectors generating said electric output signals of the combined storage location access and tracking-error detection system; and wherein said combined coarse and fine focusing-error detection system comprises a focusing grating coupler for deflecting said second beam portion out from said second waveguide branch of said waveguide network and for focusing it onto the surface of said optical storage medium from where it is at least partially reflected and three grating couplers, two waveguides and a waveguide branch, and three photo detectors a first of said grating couplers coupling a first part of said reflected beam portion via a first of said waveguides into a first of said photo detectors, the second of said grating couplers coupling a second part of said reflected beam portion via a second of said waveguides into a second of said photo detectors, said photo detectors generating electric output signals of said coarse focusing-error detecting part; and wherein a third of said grating couplers couples a third part of said reflected beam portion via said waveguide branch of said waveguide network into a third of said photo detectors where said third part of said reflected beam portion is optically superposed with said third beam portion of said single beam which is fed via said third branch of said waveguide network to said third of said photo detectors so that the superposition of both beam portions forms an interference pattern at the third of said photo detectors and thereby generating electric output signals of said fine focusing-error detection part.

33. An integrated optical head structure as in claim 32, wherein said first and second branches of said waveguide network are connected via horn feeds to said first and second focusing grating couplers, and wherein all grating couplers are connected via horn feeds to their associated waveguides.

34. An integrated optical head structure according to claim 1, wherein said waveguide network splits said single beam into three separate beam portions, a first beam portion guided via a first waveguide branch of said waveguide network to a combined storage location access and tracking-error detection system, a second and a third beam portion guided via second and third waveguide branches of said waveguide network to a combined coarse and fine focusing-error detection system.

35. An integrated optical head structure as in claim 34, wherein said combined storage location access and tracking-error detection system comprises a focusing grating coupler for deflecting said first beam portion out from said first waveguide branch of said waveguide network and for focusing it onto the surface of said optical storage medium from where it is at least partially reflected, and two grating couplers, two waveguides, and two photo detectors, a first of said grating couplers coupling a first part of said reflected beam portion via a first of said waveguides into a first of said photodetectors, a second of said grating couplers coupling a second part of said reflected beam portion via a second of said waveguides into a second of said photodetectors, said photo detectors generating said electric output signals of the combined storage location access and tracking-error detection system; and wherein said combined coarse and fine focusing-error detection system comprises a focusing grating coupler for deflecting said second beam portion out from said second waveguide branch of said waveguide network and for focusing it onto the surface of said optical storage medium from where it is at least partially reflected and three grating couplers, two waveguides and a waveguide branch, and three photo detectors a first of said grating couplers coupling a first part of said reflected beam portion via a first of said waveguides into a first of said photo detectors, the second of said grating couplers coupling a second part of said reflected beam portion via a second of said waveguides into a second of said photo detectors, said photo detectors generating electric output signals of said coarse focusing-error detection part; and wherein a third of said grating couplers couples a third part of said reflected beam portion via said waveguide branch of said waveguide network into a third of said photo detectors where said third part of said reflected beam portion is optically superposed with said third beam portion of said single beam which is fed via said third branch of said waveguide network to said third of said photo detectors so that the superposition of both beam portions forms an interference pattern at the third of said photo detectors and thereby generating electric output signals of said fine focusing-error detection part.

36. An integrated optical head structure as in claim 35 wherein said first and second branches of said waveguide network are connected via horn feeds to said first and second focusing grating couplers and wherein all grating couplers are connected via horn feeds to their associated waveguides.

* * * * *